United States Patent
Kano et al.

(10) Patent No.: US 10,627,929 B2
(45) Date of Patent: Apr. 21, 2020

(54) INPUT TERMINAL

(71) Applicant: Murata Manufacturing Co., Ltd., Nagaokakyo-shi, Kyoto-fu (JP)

(72) Inventors: Hidekazu Kano, Nagaokakyo (JP); Kenichi Mori, Nagaokakyo (JP); Masamichi Ando, Nagaokakyo (JP); Hiroyuki Nakaji, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 77 days.

(21) Appl. No.: 15/432,283

(22) Filed: Feb. 14, 2017

(65) Prior Publication Data
US 2017/0192550 A1    Jul. 6, 2017

Related U.S. Application Data

(63) Continuation of application No. PCT/JP2015/070642, filed on Jul. 21, 2015.

(30) Foreign Application Priority Data

Aug. 19, 2014  (JP) ................. 2014-166570

(51) Int. Cl.
   *G06F 3/041*    (2006.01)
(52) U.S. Cl.
   CPC ............ *G06F 3/041* (2013.01); *G06F 3/0414* (2013.01); *G06F 2203/04103* (2013.01); *G06F 2203/04105* (2013.01)

(58) Field of Classification Search
   CPC ................. G06F 3/041; G06F 3/0414; H06G 2203/04105; H06G 2203/04103
   See application file for complete search history.

(56) References Cited

U.S. PATENT DOCUMENTS

| | | | |
|---|---|---|---|
| 8,060,168 B2 * | 11/2011 | Horrdin | G06F 1/1616 29/729 |
| 9,110,532 B2 | 8/2015 | Ando et al. | |
| 9,128,553 B2 | 9/2015 | Andoh | |
| 9,134,826 B2 | 9/2015 | Andoh | |
| 9,223,349 B2 * | 12/2015 | Franklin | G06F 1/1643 |
| 9,383,884 B2 | 7/2016 | Ando | |

(Continued)

FOREIGN PATENT DOCUMENTS

| | | |
|---|---|---|
| JP | 2011-253517 A | 12/2011 |
| JP | 2013-242900 A | 12/2013 |

(Continued)

OTHER PUBLICATIONS

International Search Report issued of International Application No. PCT/JP2015/070642, dated Oct. 6, 2015.

(Continued)

*Primary Examiner* — Christopher E Leiby
(74) *Attorney, Agent, or Firm* — Arent Fox LLP

(57) ABSTRACT

An input terminal that includes a casing defining an opening; a holding member; a piezoelectric sensor; and an adhesive material adhering an outer peripheral edge portion of the holding member to an end edge portion of an opening of the casing. The adhesive material includes a first portion and a second portion. The first portion and the second portion differ from each other in at least one of modulus of elasticity, thickness or width.

21 Claims, 16 Drawing Sheets

(56) References Cited

U.S. PATENT DOCUMENTS

| | | |
|---|---|---|
| 9,417,737 B2 | 8/2016 | Ando et al. |
| 9,430,099 B2 | 8/2016 | Ando et al. |
| 9,459,160 B2* | 10/2016 | Shaw .............. G01L 1/146 |
| 2003/0067449 A1* | 4/2003 | Yoshikawa .......... G06F 3/016 |
| | | 345/173 |
| 2006/0181522 A1* | 8/2006 | Nishimura .......... G06F 3/016 |
| | | 345/177 |
| 2006/0232564 A1* | 10/2006 | Nishimura .......... G06F 1/18 |
| | | 345/173 |
| 2007/0080951 A1* | 4/2007 | Maruyama .......... G06F 1/1626 |
| | | 345/173 |
| 2011/0025090 A1* | 2/2011 | Langlais .............. B60J 1/10 |
| | | 296/146.15 |
| 2011/0051334 A1* | 3/2011 | Griffith ............ G06F 3/03547 |
| | | 361/679.01 |
| 2012/0075226 A1 | 3/2012 | Andoh |
| 2013/0057499 A1 | 3/2013 | Ando et al. |
| 2013/0328817 A1 | 12/2013 | Andoh |
| 2014/0292699 A1 | 10/2014 | Ando |
| 2015/0153880 A1 | 6/2015 | Ando |
| 2015/0261337 A1 | 9/2015 | Ando et al. |
| 2015/0346881 A1 | 12/2015 | Watazu |
| 2016/0008851 A1* | 1/2016 | Tajitsu .............. H01L 41/45 |
| | | 381/190 |
| 2016/0034073 A1 | 2/2016 | Andoh |
| 2016/0041694 A1 | 2/2016 | Ando et al. |
| 2016/0062517 A1* | 3/2016 | Meyer .............. G06F 3/0414 |
| | | 345/173 |

FOREIGN PATENT DOCUMENTS

| | | |
|---|---|---|
| JP | 2014-134452 A | 7/2014 |
| WO | WO 2013/089048 A1 | 6/2013 |

OTHER PUBLICATIONS

Written Opinion of the International Searching Authority issued for International Application No. PCT/JP2015/070642, dated Oct. 6, 2015.

* cited by examiner (SECOND DIRECTION)

(FIRST DIRECTION)

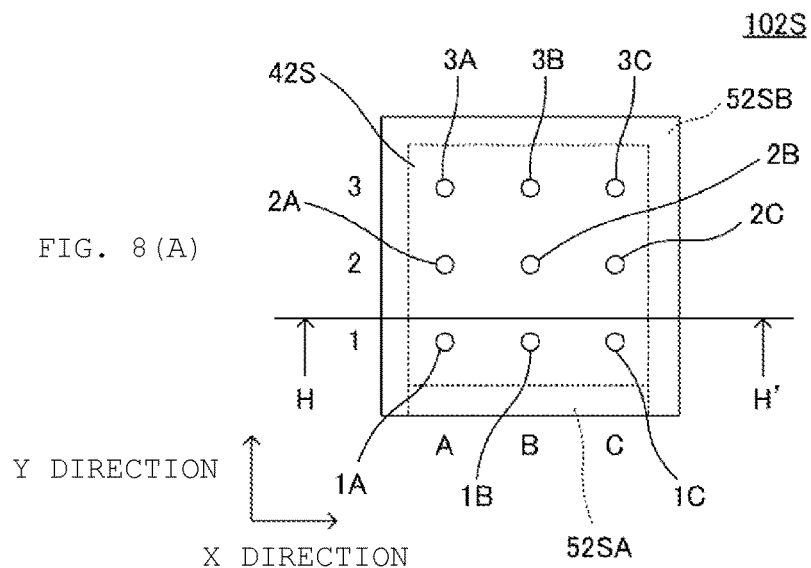
FIG. 8(A)
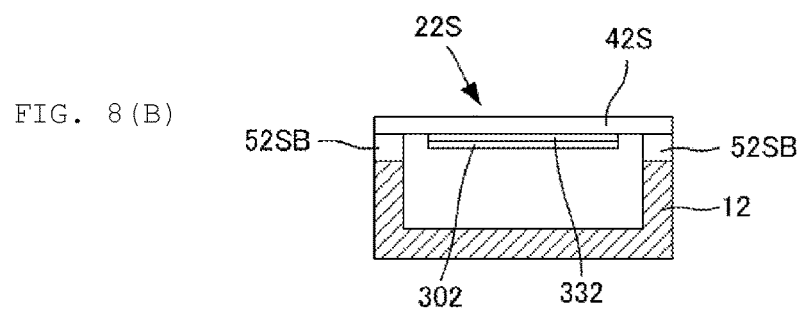
FIG. 8(B)
FIG. 9
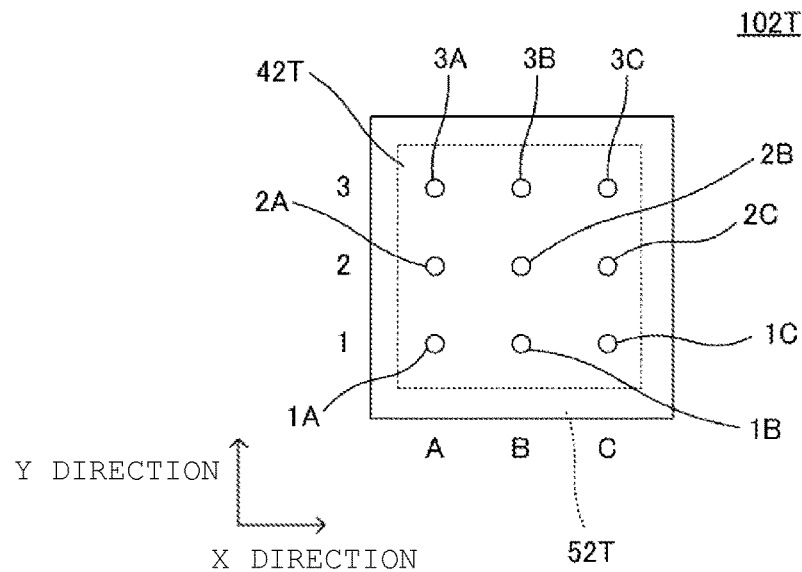

INPUT TERMINAL

CROSS REFERENCE TO RELATED APPLICATIONS

The present application is a continuation of International application No. PCT/JP2015/070642, filed Jul. 21, 2015, which claims priority to Japanese Patent Application No. 2014-166570, filed Aug. 19, 2014, the entire contents of each of which are incorporated herein by reference.

FIELD OF THE INVENTION

The present invention relates to an input terminal formed using a piezoelectric film.

BACKGROUND OF THE INVENTION

Recently, various input terminals which can detect pressing force information have been proposed. An input terminal which can detect pressing force information is, for example, an input terminal which is mounted on a surface of a display, and which a user can input pressing force information on a flat surface by directly touching the input terminal with his finger or by touching the input terminal using a dedicated instrument.

As a technique relating to such an input terminal, patent document 1 discloses an input terminal having a structure where an operation surface is formed by laminating a piezoelectric film to a holding member (formed of an acrylic cover, a glass cover or the like), and an outer peripheral edge of the operation surface is adhered to a casing. Such a piezoelectric film is formed using an L-type polylactic acid (PLLA) which is uniaxially stretched so as not to be influenced by pyroelectricity. With such a configuration, the input terminal can detect pressing force information based on a voltage (charge) generated due to strain in the piezoelectric film when a pressing operation is performed on the operation surface.

Patent Document 1: Japanese Patent Application Laid-Open No. 2013-242900

SUMMARY OF THE INVENTION

To suppress the intrusion of a foreign substance into the input terminal, the whole outer peripheral edge portion of the operation surface formed by laminating the piezoelectric film to the holding member is fixed to the casing. However, when a pressing operation is performed in such a state, a region is formed in the piezoelectric film where a polarity of voltage (charge) generated due to the strain in the piezoelectric film is inverted. When the region where a polarity of a voltage (charge) is inverted is formed, generated voltages (charges) offset each other and hence, detection sensitivity for detecting pressing force information becomes weak.

On the other hand, it has been known that when a pressing operation is performed in a state where an outer peripheral edge portion of an operation surface formed by laminating a piezoelectric film to a holding member has a portion which is not fixed to a casing, the formation of regions where a polarity of a voltage (charge) is inverted is suppressed. However, to suppress the intrusion of a foreign substance into an input terminal, it is necessary to fix the whole outer peripheral edge portion of the operation surface formed by laminating the piezoelectric film to the holding member to the casing and hence, this method cannot be adopted.

It is an object of the present invention to provide an input terminal which can suppress lowering of detection sensitivity for detecting pressing force information while having the configuration where the whole outer peripheral edge portion of an operation surface is fixed to a casing.

An input terminal according to one embodiment of the present invention includes: a casing having an opening portion; a flat-plate-like holding member having a first principal surface and a second principal surface disposed opposite to each other; a flat-film-like piezoelectric film having a third principal surface and a fourth principal surface disposed opposite to each other, wherein the third principal surface is disposed so as to oppositely face the second principal surface of the holding member; an adhesive material provided for fixedly adhering an entire outer peripheral edge portion of the holding member to an end edge portion of the opening portion in a state where the piezoelectric film is accommodated in the inside of the casing; and piezoelectric voltage detecting electrodes formed on the third principal surface and the fourth principal surface of the piezoelectric film respectively, wherein the piezoelectric voltage detecting electrode is configured to detect a voltage corresponding to an amount of strain in the piezoelectric film when a pressing operation is performed on the principal surface of the holding member, wherein the adhesive material has a first adhesive material which forms a portion of the adhesive material, and a second adhesive material which forms a remaining portion of the adhesive material, and the first adhesive material and the second adhesive material differ from each other in modulus of elasticity.

A material having a small modulus of elasticity is softer and is more deformable than a material having a large modulus of elasticity. Accordingly, when a pressing operation is performed on the panel (the first principal surface of the holding member), a portion of the panel fixed by the adhesive material having a small modulus of elasticity is deformed into approximately the same shape as a case where the panel is pressed in a state where the panel is not fixed to the casing. At this stage of operation, the piezoelectric film of the piezoelectric sensor adhered to the holding member is stretched only in approximately one direction and hence, the formation of regions where a polarity of voltage is inverted is suppressed. Accordingly, the lowering of detection sensitivity for detecting pressing force information can be prevented by the above-mentioned configuration.

It is preferable that the holding member have a quadrangular planar shape, and a modulus of elasticity of the first adhesive material provided for fixedly adhering at least one side of the holding member be smaller than a modulus of elasticity of the second adhesive material provided for fixedly adhering other sides of the holding member. With such a configuration, when a pressing operation is performed on the panel (the first principal surface of the holding member), the piezoelectric film can be stretched only in approximately one direction. Accordingly, the formation of regions where a polarity of voltage is inverted is suppressed and hence, the lowering of detection sensitivity for detecting pressing force information can be prevented.

It is preferable that the holding member have a rectangular planar shape, and a modulus of elasticity of the first adhesive material provided for fixedly adhering two long sides of the holding member be smaller than a modulus of elasticity of the second adhesive material provided for fixedly adhering two short sides of the holding member. With such a configuration, two long sides of the rectangular holding member are easily deflectable compared to two short sides of the rectangular holding member and hence, when a pressing operation is performed on the panel (the first principal surface of the holding member), two short sides of the rectangular panel (the first principal surface of the holding member) are minimally deflected, while two long sides of the rectangular panel are largely deflected. That is, when a pressing operation is performed on the panel (the first principal surface of the holding member), the piezoelectric film of the piezoelectric sensor adhered to the holding member is stretched only in approximately one direction and hence, the formation of regions where a polarity of voltage is inverted is suppressed. Accordingly, lowering of detection sensitivity for detecting pressing force information can be prevented.

An input terminal according to the present invention includes: a casing having an opening portion; a flat-plate-like holding member having a first principal surface and a second principal surface disposed opposite to each other; a flat-film-like piezoelectric film having a third principal surface and a fourth principal surface disposed opposite to each other, wherein the third principal surface is disposed so as to opposedly face the second principal surface of the holding member; an adhesive material provided for fixedly adhering an entire outer peripheral edge portion of the holding member to an end edge portion of the opening portion in a state where the piezoelectric film is accommodated in the inside of the casing; and piezoelectric voltage detecting electrodes formed on the third principal surface and the fourth principal surface of the piezoelectric film respectively, wherein the piezoelectric voltage detecting electrode is configured to detect a voltage corresponding to an amount of strain in the piezoelectric film when a pressing operation is performed on the principal surface of the holding member, wherein the adhesive material has a first adhesive material which forms a portion of the adhesive material, and a second adhesive material which forms a remaining portion of the adhesive material, and a thickness of the first adhesive material and a thickness of the second adhesive material differ from each other or a width of the first adhesive material which is a distance between an inner peripheral edge and an outer peripheral edge of the first adhesive material and a width of the second adhesive material which is a distance between an inner peripheral edge and an outer peripheral edge of the second adhesive material differ from each other.

When a thickness of the adhesive material is small, a range where the panel can be deflected in the pressing direction is small. Accordingly, in a state where the thickness of a portion of the adhesive material and the thickness of a remaining portion of the adhesive material differ from each other, when a pressing operation is performed on the panel (the first principal surface of the holding member), the portion of the panel which is fixedly adhered by the adhesive material having a large thickness is forcibly largely deflected. Accordingly, the portion of the panel which is fixedly adhered by the adhesive material having a large thickness is deformed into approximately the same shape as the case where the panel is pressed in a state where the panel is not fixed to the casing. At this stage of operation, the piezoelectric film of the piezoelectric sensor adhered to the holding member is stretched only in approximately one direction and hence, the formation of regions where a polarity of voltage is inverted is suppressed. Accordingly, the lowering of detection sensitivity for detecting pressing force information can be prevented by the above-mentioned configuration.

A stress ($\sigma$=F/S) is inversely proportional to an area S and hence, the larger the area S, the smaller an elastic deformation amount (=strain $\varepsilon$, $\varepsilon$=$\sigma \cdot$E) becomes. Accordingly, when an area of a portion of the adhesive material and an area of a remaining portion of the adhesive material differ from each other, the portion of the adhesive material and the remaining portion of the adhesive material differ from each other in elastic deformation amount and hence, when a pressing operation is performed on the panel (the first principal surface of the holding member), the portion of the panel which is fixedly adhered by the adhesive material having a small area is forcibly largely deflected. The area of the adhesive material is proportional to a width (a distance between an inner peripheral edge and an outer peripheral edge of the adhesive material). Accordingly, the portion of the panel which is fixedly adhered by the adhesive material having a small width (area) is deformed into approximately the same shape as the case where the panel is pressed in a state where the panel is not fixed to the casing. At this stage of operation, the piezoelectric film of the piezoelectric sensor adhered to the holding member is stretched only in approximately one direction and hence, the formation of regions where a polarity of voltage is inverted is suppressed. Accordingly, the lowering of detection sensitivity for detecting pressing force information can be prevented by the above-mentioned configuration.

It is preferable that the holding member have a quadrangular planar shape, and the thickness of the first adhesive material provided for fixedly adhering at least one side of the holding member be larger than the thickness of the second adhesive material provided for fixedly adhering other sides of the holding member, or the width which is the distance between the inner peripheral edge and the outer peripheral edge of the first adhesive material provided for fixedly adhering at least one side of the holding member be smaller than the width of the second adhesive material provided for fixedly adhering other sides of the holding member. With such a configuration, when a pressing operation is performed on the panel (the first principal surface of the holding member), the piezoelectric film can be stretched only in approximately one direction. Accordingly, the formation of regions where a polarity of voltage is inverted is suppressed and hence, the lowering of detection sensitivity for detecting pressing force information can be prevented.

It is preferable that the holding member have a rectangular planar shape, and a thickness of the first adhesive material provided for fixedly adhering two long sides of the holding member be larger than a thickness of the second adhesive material provided for fixedly adhering two short sides of the holding member, or a width which is a distance between the inner peripheral edge and the outer peripheral edge of the first adhesive material provided for fixedly adhering two long sides of the holding member be smaller than a width of the second adhesive material provided for fixedly adhering two short sides of the holding member. With such a configuration, two long sides of the rectangular holding member are easily deflectable compared to two short sides of the rectangular holding member and hence, when a pressing operation is performed on the panel (the first principal surface of the holding member), two short sides of the rectangular panel (the first principal surface of the holding member) are minimally deflected, while two long sides of the rectangular panel are largely deflected. That is, when a pressing operation is performed on the panel (the first principal surface of the holding member), the piezoelectric film of the piezoelectric sensor adhered to the holding member is stretched only in approximately one direction and hence, the formation of regions where a polarity of voltage is inverted is suppressed. Accordingly, the lowering of detection sensitivity for detecting pressing force information can be prevented.

An input terminal according to the present invention includes: a casing having an opening portion; a flat-plate-like holding member having a first principal surface and a second principal surface disposed opposite to each other; a flat-film-like piezoelectric film having a third principal surface and a fourth principal surface disposed opposite to each other, wherein the third principal surface is disposed so as to oppositely face the second principal surface of the holding member; an adhesive material provided for fixedly adhering an entire outer peripheral edge portion of the holding member to an end edge portion of the opening portion in a state where the piezoelectric film is accommodated in the inside of the casing; and piezoelectric voltage detecting electrodes formed on the third principal surface and the fourth principal surface of the piezoelectric film respectively, wherein the piezoelectric voltage detecting electrode is configured to detect a voltage corresponding to an amount of strain in the piezoelectric film when a pressing operation is performed on the principal surface of the holding member, wherein a deformation obstructing member which obstructs the deformation of the holding member when the pressing operation is performed is disposed in the inside of the casing and at a position close to an inner periphery of the adhesive material.

By disposing the deformation obstructing member at the position close to the inner periphery of the adhesive material which fixes the outer peripheral edge portion of the holding member, when a pressing operation is performed on the panel (the first principal surface of the holding member), a range within which the panel can be deflected in the pressing direction is small. Accordingly, in the case where the deformation obstructing member is partially disposed at the position close to the inner periphery of the adhesive material, when a pressing operation is performed on the panel (the first principal surface of the holding member), only portions of the panel where the deformation obstructing member is not disposed are forcibly largely deflected. Accordingly, a portion of the adhesive material having a large thickness is deformed into approximately the same shape as the case where the panel is pressed in a state where the panel is not fixed to the casing. At this stage of operation, the piezoelectric film of the piezoelectric sensor adhered to the holding member is stretched only in approximately one direction and hence, the formation of regions where a polarity of voltage is inverted is suppressed. Accordingly, the lowering of detection sensitivity for detecting pressing force information can be prevented by the above-mentioned configuration.

It is preferable that the holding member have a quadrangular planar shape, and the deformation obstructing member be disposed at a position close to an adhesive material provided for fixedly adhering at least one side of the holding member. With such a configuration, when a pressing operation is performed on the panel (the first principal surface of the holding member), the piezoelectric film is stretched only in approximately one direction. Accordingly, the formation of regions where a polarity of voltage is inverted is suppressed and hence, the lowering of detection sensitivity for detecting pressing force information can be prevented.

It is preferable that the holding member have a rectangular planar shape, and the deformation obstructing member be disposed at a position close to an adhesive material provided for fixedly adhering two short sides of the holding member. With such a configuration, two long sides of the rectangular holding member are easily deflectable compared to two short sides of the rectangular holding member and hence, when a pressing operation is performed on the panel (the first principal surface of the holding member), two short sides of the rectangular panel (the first principal surface of the holding member) are minimally deflected, while two long sides of the rectangular panel are largely deflected. That is, when a pressing operation is performed on the panel (the first principal surface of the holding member), the piezoelectric film of the piezoelectric sensor adhered to the holding member is stretched only in approximately one direction and hence, the formation of regions where a polarity of voltage is inverted is suppressed. Accordingly, the lowering of detection sensitivity for detecting pressing force information can be prevented.

It is preferable that the piezoelectric film be formed using a polylactic acid to which stretching processing is applied at least in uniaxial direction. With such a configuration, pyroelectricity which is generated in other piezoelectric elements having ferroelectricity is not generated in this piezoelectric film and hence, an amount of strain can be detected with extremely high sensitivity.

According to the present invention, it is possible to provide an input terminal which can suppress lowering of detection sensitivity for detecting pressing force information while having the configuration where the whole outer peripheral edge portion of an operation surface is fixed to a casing.

BRIEF EXPLANATION OF THE DRAWINGS

FIG. 8(A) is a plan view of an input terminal 102S which is a simulation model, and FIG. 8(B) is a cross-sectional view taken along a line H-H' in FIG. 8(A).

FIG. 9 is a plan view of an input terminal 102T which is a simulation model.

DETAILED DESCRIPTION OF PREFERRED EMBODIMENTS OF THE INVENTION

Hereinafter, a plurality of modes for carrying out the present invention are described with reference to drawings. In the respective drawings, the same symbols are given to identical members. The respective embodiments are merely examples, and features of each embodiment may be partially replaced or combined with features described in a different embodiment.

First Embodiment

Figure 1:
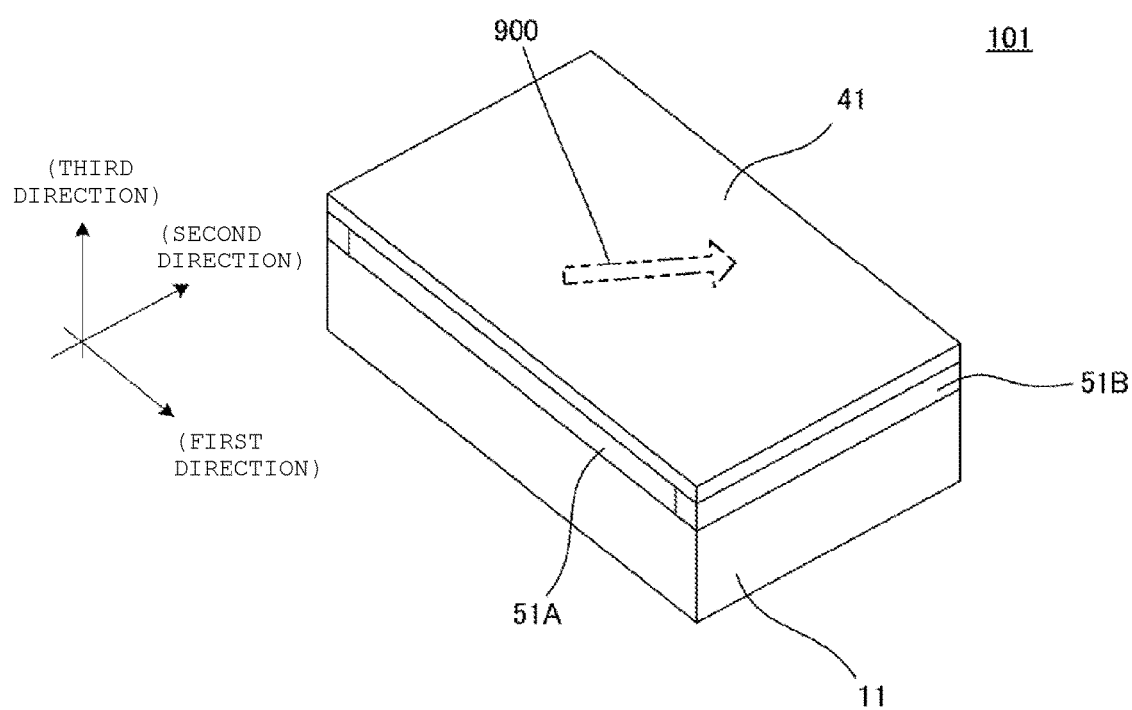
FIG. 1 is a perspective view showing an external appearance of an input terminal 101 according to a first embodiment of the present invention.
Figure 2A:
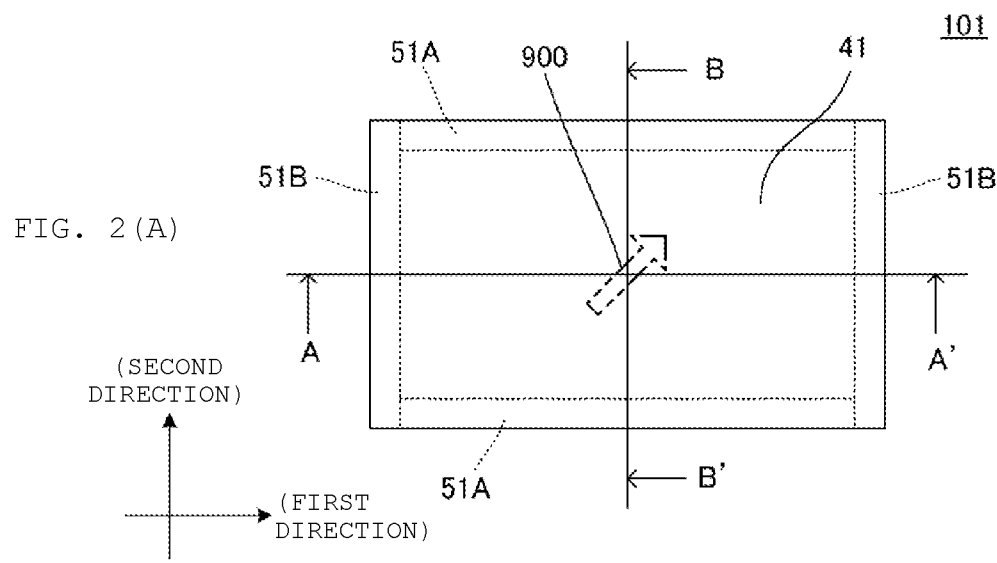
FIG. 2(A) is a plan view showing the structure of the input terminal 101.
Figure 2B:
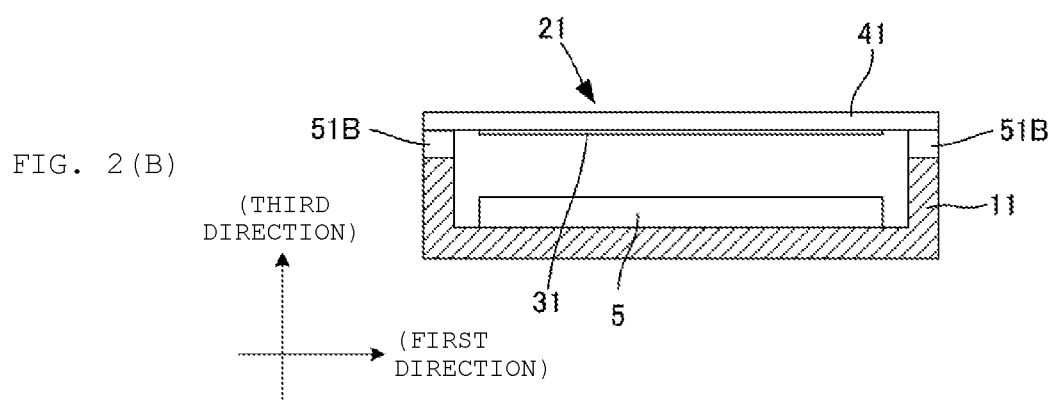
FIG. 2(B) is a cross-sectional view taken along a line A-A' in FIG. 2(A)
Figure 2C:
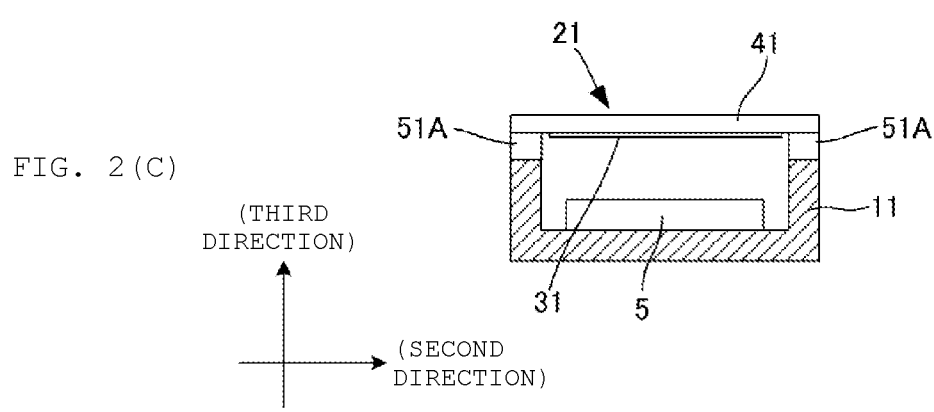
FIG. 2(C) is a cross-sectional view taken along a line B-B' in FIG. 2(A).
Figure 3A:
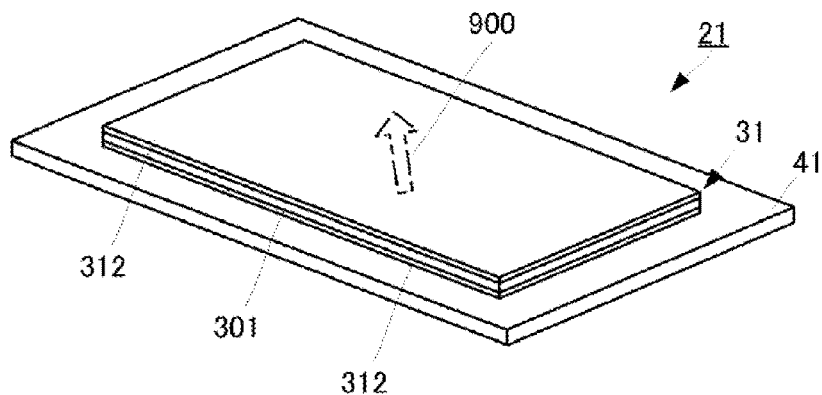
FIG. 3(A) is a perspective view showing an external appearance of a rear surface of a panel 21.
Figure 3B:
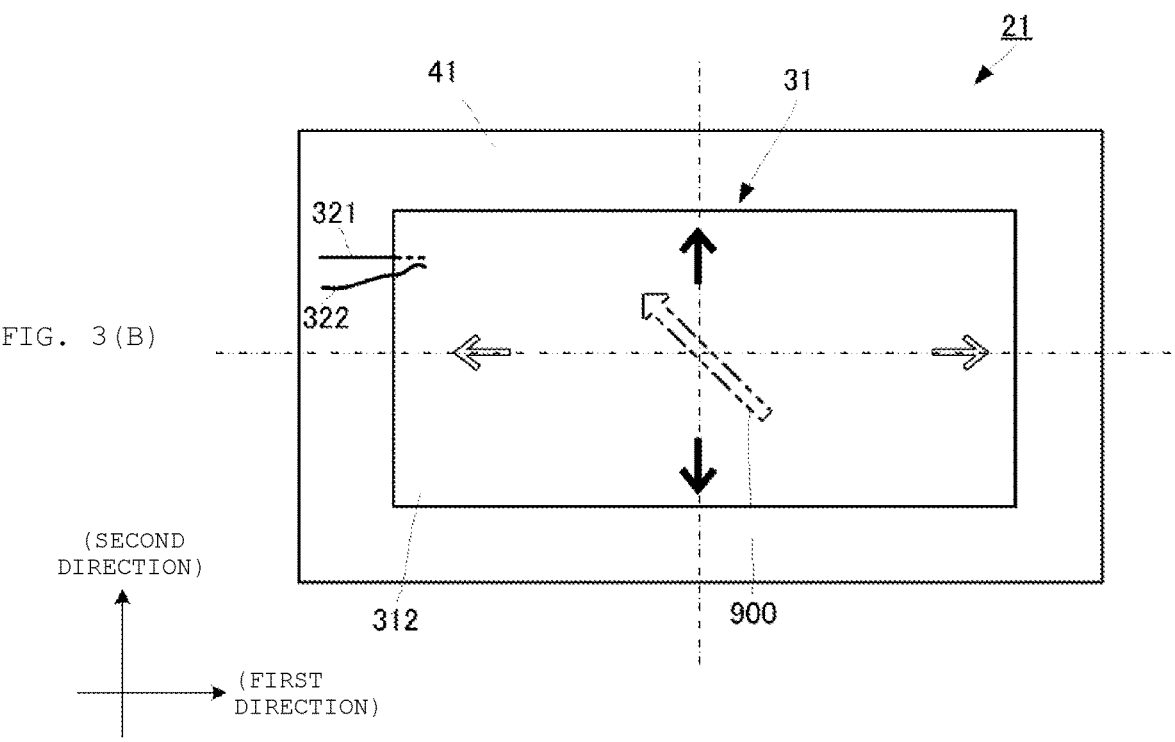
FIG. 3(B) is a back view of the panel 21.
Figure 3C:
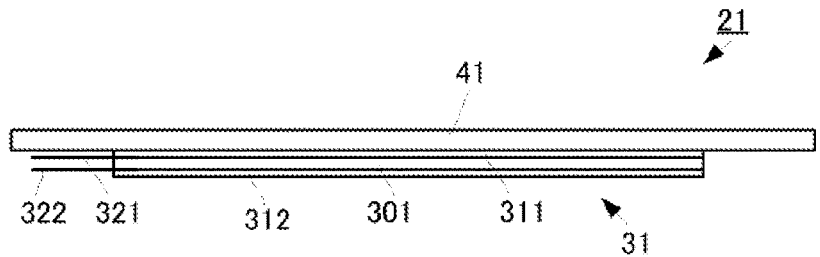
FIG. 3(C) is a front view of the panel 21.

An input terminal according to a first embodiment of the present invention is described with reference to drawings. FIG. 1 is a perspective view showing an external appearance of an input terminal 101 according to the first embodiment of the present invention. FIGS. 2(A) to 2(C) are views describing the structure of the input terminal 101 according to the first embodiment of the present invention. FIG. 2(A) is a plan view showing the structure of the input terminal 101, FIG. 2(B) is a cross-sectional view taken along a line A-A' in FIG. 2(A), FIG. 2(C) is a cross-sectional view taken along a line B-B' in FIG. 2(A). In FIGS. 2(A) to 2(C), the structure of a panel 21 is illustrated in a simplified manner for facilitating the understanding of the drawing and the principle. FIGS. 3(A) to 3(C) are views showing the structure of the panel 21 of the input terminal 101. FIG. 3(A) is a perspective view showing an external appearance of a back surface of the panel 21, FIG. 3(B) is a back view of the panel 21, and FIG. 3(C) is a front view of the panel 21. In FIG. 1, FIGS. 2(A) to 2(C) and FIGS. 3(A) to 3(C), a thickness of each part is illustrated in an exaggerated manner. The same goes for cross-sectional views of the following respective embodiments.

The input terminal 101 includes: a casing 11; a panel 21; a circuit board 5; adhesive materials 51A; and adhesive materials 51B. The panel 21 is formed by combining a piezoelectric sensor 31 and a holding member 41 with each other, and the panel 21 has the structure shown in FIGS. 3(A) to 3(C).

The piezoelectric sensor 31 includes: a piezoelectric film 301; a piezoelectric voltage detecting electrode 311; and a piezoelectric voltage detecting electrode 312. The piezoelectric film 301 is formed of a rectangular flat film having a third principal surface and a fourth principal surface which are disposed on opposite sides respectively, and the piezoelectric film 301 is formed using an L-type polylactic acid (PLLA) which is uniaxially stretched. In such a configuration, a long side direction of a rectangular shape is assumed as a first direction, and a short side direction of the rectangular shape is assumed as a second direction. In this embodiment, the piezoelectric film 301 is uniaxially stretched in a direction approximately along a diagonal line of the rectangular shape (see a white arrow indicated by a double-dashed chain line in FIG. 3(A) and FIG. 3(B)). Such a direction is referred to as "uniaxial stretching direction 900" hereinafter. When the piezoelectric film 301 has a square shape, the uniaxial stretching direction 900 preferably extends along a diagonal line of the square shape. When the piezoelectric film 301 has a rectangular shape, an angle of 45° is preferably made by the uniaxial stretching direction 900 with respect to the first direction or the second direction. However, an angle made by the uniaxial stretching direction 900 with respect to the first direction or the second direction is not limited to 45°. Although there is a description that the angle made is preferably set to 45°, substantially the same advantageous effect can be acquired provided that a tolerance in angle falls within a range of approximately ±10° from 45°. An optimal angle may be designed by taking into account characteristics of the piezoelectric film 301 and a use state of a device. In view of the above, the uniaxial stretching direction 900 is set to have predetermined angles with respect to the first direction and the second direction of the piezoelectric film 301.

PLLA is a chiral polymer, and a main chain of PLLA has the helical structure. When PLLA is uniaxially stretched so that molecules of PLLA are oriented, PLLA possesses piezoelectricity. A piezoelectric constant of PLLA which is formed in an uniaxially stretched manner belongs to a category of extremely high piezoelectric constant among polymers.

A stretch ratio of PLLA is preferably set to approximately 3 to 8 times. When heat treatment is applied to PLLA after PLLA is stretched, crystallization of stretched-chain crystal of a polylactic acid is accelerated so that a piezoelectric constant of PLLA is increased. In the case where PLLA is biaxially stretched, by making stretch ratios in respective axes differ from each other, substantially the same advantageous effect as the case where PLLA is uniaxially stretched can be acquired. For example, to consider the case where a certain direction is assumed as an X axis and PLLA is stretched in the X axis direction at a stretch ratio of 8 times and in the Y axis direction orthogonal to the X axis at a stretch ratio of 2 times, with respect to a piezoelectric constant, the case can acquire substantially the same advantageous effects as the case where PLLA is uniaxially stretched in the X axis direction at a stretch ratio of approximately 4 times. A film which is simply uniaxially stretched is liable to be easily torn along the stretching axis direction. On the other hand, by biaxially stretching a film as described above, a strength of the film can be increased to some extent.

In PLLA, piezoelectricity is generated due to molecular orientation treatment such as stretching. Accordingly, unlike other polymers such as PVDF and piezoelectric ceramics, it is unnecessary to apply polling processing to PLLA. That is, unlike piezoelectricity of a ferroelectric material such as PVDF or PZT, piezoelectricity of PLLA which does not belong to a ferroelectric material is not generated due to polarization of ions but is derived from the helical structure which is a characteristic structure of the molecules. Accordingly, pyroelectricity which is generated in other piezoelectric elements having ferroelectricity is not generated in PLLA. Further, although a piezoelectric constant of PVDF or the like changes over time and is remarkably lowered depending on a case, a piezoelectric constant of PLLA is extremely stable over a long period.

PLLA has a large piezoelectric output constant (=piezoelectric g-constant, $g=d/\varepsilon T$). Accordingly, with the use of PLLA, an amount of strain can be detected with extremely high sensitivity. This embodiment is mainly described by taking the case where PLLA is used as an example. However, PDLA which is an optical isomer of PLLA may also be used.

Piezoelectricity of PLLA has anisotropy and hence, a polarity (symbol "+" and "−") of a generated voltage (charge) differs depending on an angle made by the uniaxial stretching direction of PLLA and expansion/contraction (strain) of PLLA. For example, a polarity of voltage (charge) generated when the piezoelectric film 301 is stretched in the +45° direction with respect to the uniaxial stretching direction 900 (see an arrow in FIG. 3(B)) differs from a polarity of voltage (charge) generated when the piezoelectric film 301 is stretched in the −45° direction with respect to the uniaxial stretching direction 900 (see the white arrow in FIG. 3(B)).

Substantially over the entire surface of a third principal surface (a principal surface on one side) of the piezoelectric film 301 which is formed using PLLA having such characteristics, the piezoelectric voltage detecting electrode 311 is formed. Substantially over the entire surface of a fourth principal surface (a principal surface on the other side) of the piezoelectric film 301, the piezoelectric voltage detecting electrode 312 is formed. Due to the formation of these electrodes 311, 312 on the piezoelectric film 301, when a pressing operation is performed on the panel 21, a voltage (charge) generated corresponding to an amount of strain in the piezoelectric film 301 can be detected. An external connection terminal 321 is connected to the piezoelectric voltage detecting electrode 311, and an external connection terminal 322 is connected to the piezoelectric voltage detecting electrode 312. A region of the piezoelectric film 301 which is sandwiched by the piezoelectric voltage detecting electrode 311 and the piezoelectric voltage detecting electrode 312 forms a detection region, and the detection region functions as a voltage detecting portion of the input terminal 101.

As the piezoelectric voltage detecting electrode 311 and the piezoelectric voltage detecting electrode 312, it is preferable to use any one of an electrode made of ITO, an electrode made of ZnO and an organic electrode which contains polythiophene as a main component, an organic electrode which contains polyaniline as a main component, a silver nanowire electrode and a carbon nano tube electrode. By forming the piezoelectric voltage detecting electrode 311 and the piezoelectric voltage detecting electrode 312 using such materials, an electrode pattern having high light transmissivity can be formed. When the electrode pattern is not required to have transparency, an electrode formed using a silver paste, or a metal-based electrode formed by vapor deposition, sputtering, plating or the like may also be used. To impart a large strain to the panel 21, it is preferable to use an electrode having excellent flexibility such as an organic electrode which contains polythiophene as a main component, an organic electrode which contains polyaniline as a main component, a silver nanowire electrode, a carbon nano tube electrode or a metal-based electrode.

The piezoelectric sensor 31 having such a configuration has a first principal surface and a second principal surface which are disposed on opposite sides respectively, and is adhered to a second principal surface of the holding member 41 which is formed of a rectangular flat plate. A first principal surface of the holding member 41 which is a principal surface on one side forms an operation surface used when a pressing operation is performed on the panel 21. The second principal surface of the holding member 41 which is a principal surface on the other side is a surface to which the piezoelectric sensor 31 accommodated in the inside of the casing 11 is adhered. That is, as shown in FIGS. 3(A) to 3(C), the piezoelectric sensor 31 is disposed such that the third principal surface of the piezoelectric film 301 of the piezoelectric sensor 31 opposedly faces the second principal surface of the holding member 41 in parallel to each other. The piezoelectric sensor 31 is adhered to the holding member 41 as described above and hence, when a front surface of the holding member 41 is expanded or contracted due to strain in the holding member 41, the piezoelectric film 301 is also expanded or contracted along with the expansion or contraction of the front surface of the holding member 41.

The holding member 41 is formed using a polymer having relatively high strength such as glass, polycarbonate (PC), or an acrylic resin (PMMA). When the holding member 41 is used in a device which is not required to have transparency, the holding member 41 may be formed using metal. A thickness of the holding member 41 is desirably set corresponding to strength which the holding member 41 is required to have.

The casing 11 has an opening portion, and the circuit board 5 is disposed in the inside of the casing 11. The circuit board 5 is formed of a printed circuit board, for example. Although not shown in the drawing, a battery and the like are mounted on the board.

As shown in FIGS. 2(A) to 2(C), the input terminal 101 is formed such that the opening portion of the casing 11 is covered by the holding member 41 (panel 21) in a state where the piezoelectric film 301 (piezoelectric sensor 31) is accommodated in the inside of the casing 11. An entire outer peripheral edge portion of the holding member 41 is fixedly adhered to an end edge portion of the opening portion of the casing 11 by two kinds of adhesive materials, that is, the adhesive material 51A and the adhesive material 51B. The adhesive material 51A is an adhesive material provided for fixedly adhering the outer peripheral edge portions of two long sides of the rectangular holding member 41 to portions of the end edge portion of the opening portion of the casing 11. The adhesive material 51B is an adhesive material provided for fixedly adhering the outer peripheral edge portion of two short sides of the rectangular holding member 41 to portions of the end edge portion of the opening portion of the casing 11. A modulus of elasticity (=Young's modulus E, E=σ/c) of the adhesive material 51BA is smaller than a modulus of elasticity of the adhesive material 51B.

With such a configuration, the panel 21 provided with the piezoelectric sensor 31 can be formed into a flat plate shape, that is, the panel 21 can be made thin. By forming the entire structure formed of the piezoelectric sensor 31 and the entire holding member 41 using a material having light transmissivity, the panel 21 having light transmissivity can be formed. As described above, with the use of the panel 21 having light transmissivity, in the case where a liquid crystal display or the like is disposed on a back surface side of the input terminal 101, a display on the liquid crystal display can be observed. It is also possible to dispose a photocell or the like on the back surface side of the input terminal 101. By disposing the photocell in this manner, it is possible to charge a secondary battery which is disposed as an element separate from the photocell with electricity generated by the photocell, and the secondary battery can be utilized as a power source for the input terminal 101.

Figure 4A:
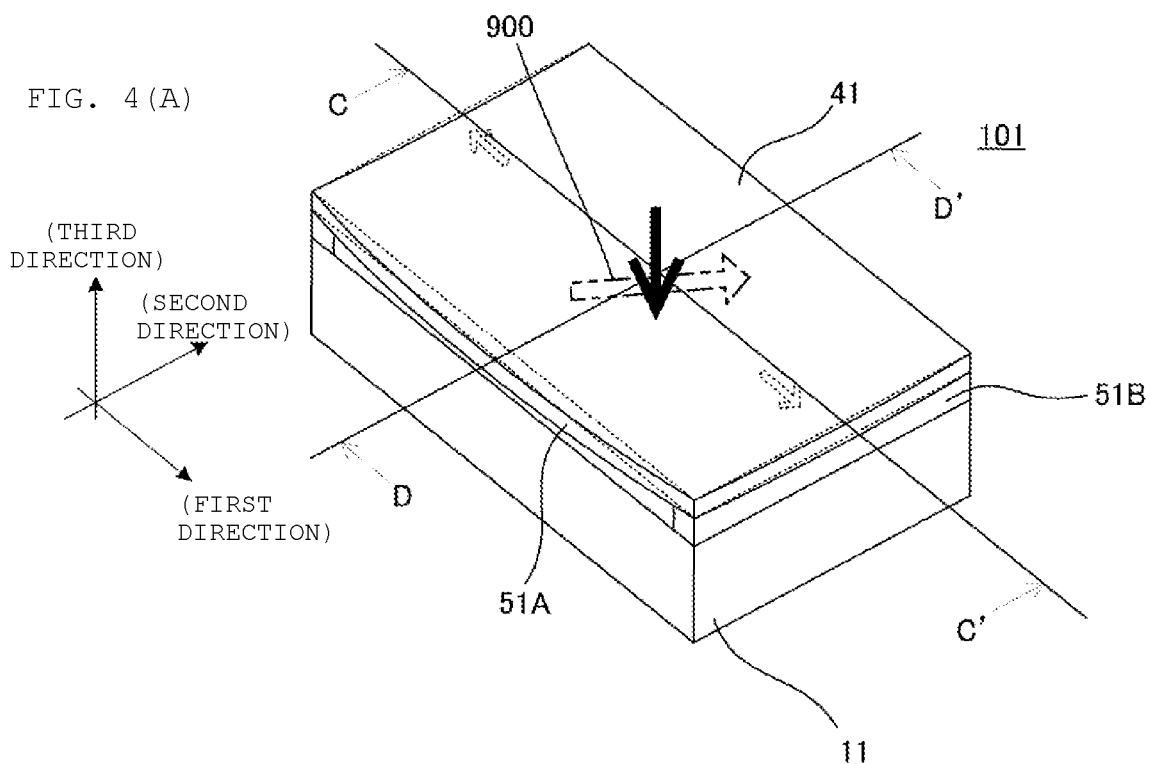
FIG. 4(A) is a perspective view showing an external appearance of the input terminal 101 according to the first embodiment in a state where a pressing operation is performed on the panel 21.
Figure 4B:
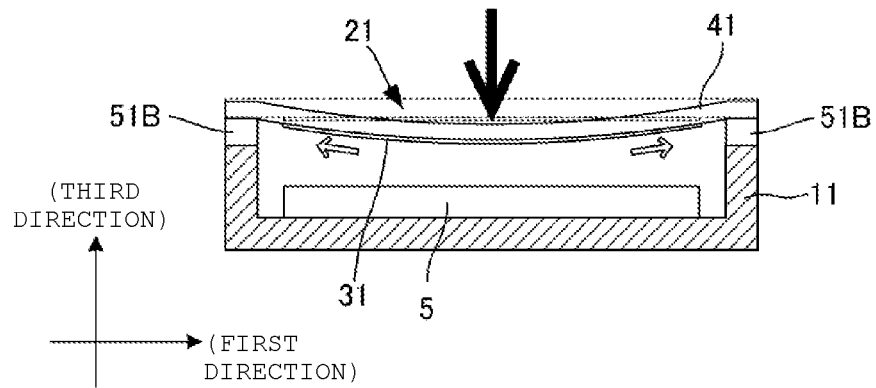
FIG. 4(B) is a cross-sectional view taken along a line C-C' in FIG. 4(A)
Figure 4C:
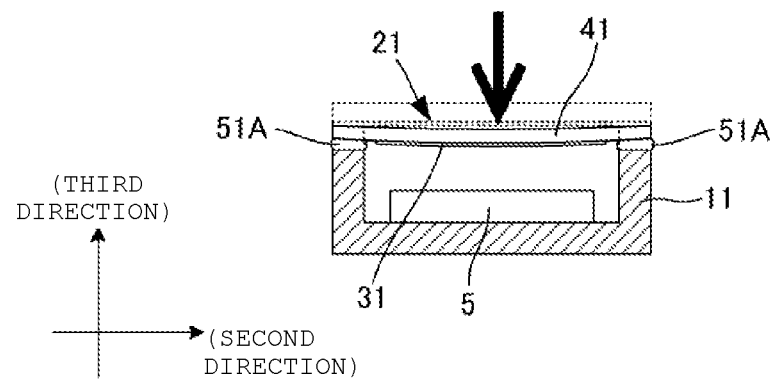
FIG. 4(C) is a cross-sectional view taken along a line D-D' in FIG. 4(A).

Next, the manner of deflection of the panel 21 according to this embodiment when a pressing operation is performed on the panel 21 is described in more detail. FIGS. 4(A) to 4(C) are conceptual views of the input terminal 101 according to the first embodiment when a pressing operation is performed on the panel 21. FIG. 4(A) is a perspective view showing an external appearance of the input terminal 101 according to the first embodiment in a state where a pressing operation is performed on the panel 21, FIG. 4(B) is a cross-sectional view taken along a line C-C' in FIG. 4(A), and FIG. 4(C) is a cross-sectional view taken along a line D-D' in FIG. 4(A). In FIGS. 4(A) to 4(C), the structure of the panel 21 is illustrated in a simplified manner for facilitating the understanding of the drawings and the principles. In FIGS. 4(A) to 4(C), an upper side of the drawing corresponds to an operation surface side of the panel 21.

A material having a small modulus of elasticity is softer and is more deformable than a material having a large modulus of elasticity. Accordingly, when a pressing operation is performed on the panel (the first principal surface of the holding member), portions of the panel fixed by the adhesive material having a small modulus of elasticity are largely deformed compared to portions of the panel fixed by the adhesive material having a large modulus of elasticity. That is, when a pressing operation is performed on the panel (the first principal surface of the holding member), the portions of the panel fixed by the adhesive material having a small modulus of elasticity are deformed into approximately the same shape as the case where the panel is pressed in a state where the panel is not fixed to the casing.

In this embodiment, as described previously, the adhesive material 51A provided for fixedly adhering the outer peripheral edge portions of two long sides of the rectangular holding member 41 to an end edge portion of the opening portion of the casing 11 has a smaller modulus of elasticity than the adhesive material 51B provided for fixedly adhering the outer peripheral edge portions of two short sides of the rectangular holding member 41 to the end edge portion of the opening portion of the casing 11. Accordingly, two long sides of the rectangular holding member 41 are easily deflectable compared to two short sides of the rectangular holding member 41. Accordingly, when a pressing operation is performed on the panel 21 (the first principal surface of the holding member 41), as shown in FIGS. 4(A) to 4(C), two short sides of the rectangular panel 21 (the first principal surface of the holding member 41) are minimally deflected, while two long sides of the rectangular panel 21 are largely deflected. That is, the panel 21 (the first principal surface of the holding member 41) is deflected into approximately the same shape as the case where a pressing operation is performed on the panel (the first principal surface of the holding member) in a state where the outer peripheral edge portions of two short sides of the rectangular holding member are fixedly adhered to the end edge portion of the opening portion of the casing by the adhesive materials and the outer peripheral edge portions of two long sides of the holding member are not fixedly adhered to the end edge portion of the opening portion of the casing.

As described above, when an external force is applied to a center portion of the panel 21 by pressing, as shown in FIG. 4(B), the holding member 41 of the panel 21 is curved in a valley shape along the long side direction. The piezoelectric sensor 31 is adhered to the holding member 41 and hence, the piezoelectric film of the piezoelectric sensor 31 is stretched in the long side direction (first direction) along with the stretching of the surface of the holding member 41 (see a white arrow in FIG. 4(B)). On the other hand, when an external force is applied to the center portion of the panel 21 by pressing, as shown in FIG. 4(C), a principal surface of the holding member 41 of the panel 21 sinks in the pressing direction while maintaining an approximately flat shape and hence, the panel 21 is minimally curved along the short side direction (second direction). Accordingly, the piezoelectric film of the piezoelectric sensor 31 adhered to the holding member 41 is minimally stretched in the short side direction. As described above, according to this embodiment, when a pressing operation is performed on the panel, the piezoelectric film can be stretched only in approximately one direction (long side direction).

Figure 5A:
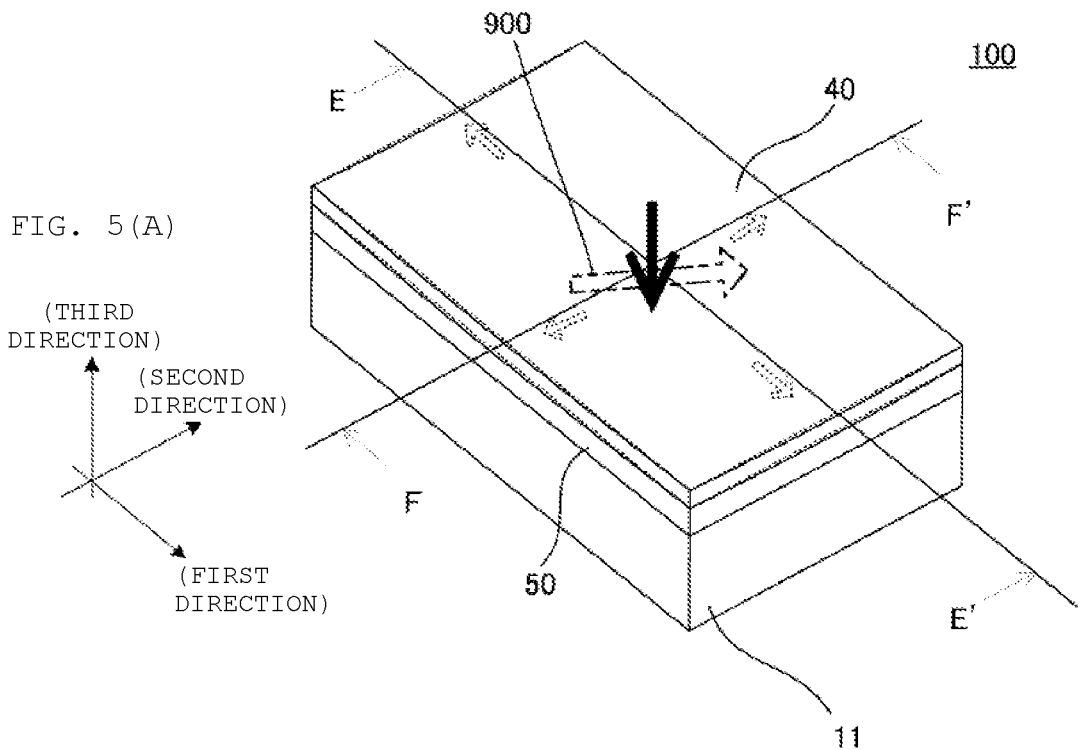
FIG. 5(A) is a perspective view showing an external appearance of the input terminal 101 in a state where a pressing operation is performed on a panel 20.
Figure 5B:
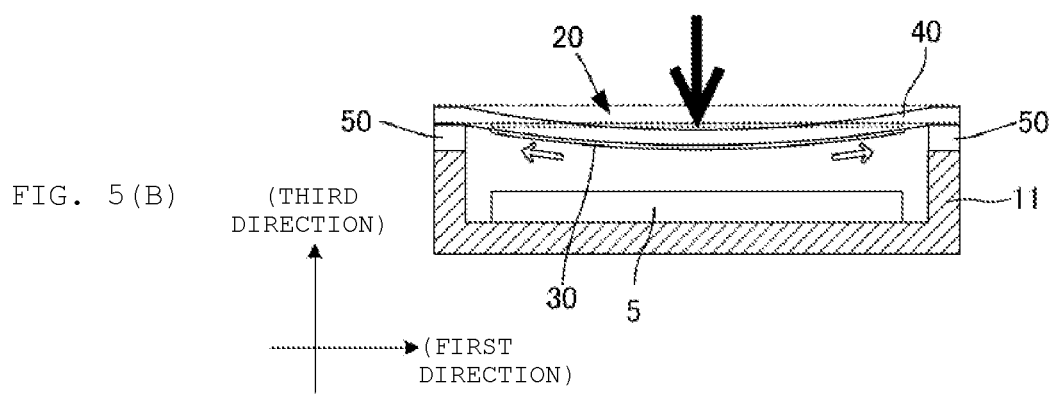
FIG. 5(B) is a cross-sectional view taken along a line E-E' in FIG. 5(A)
Figure 5C:
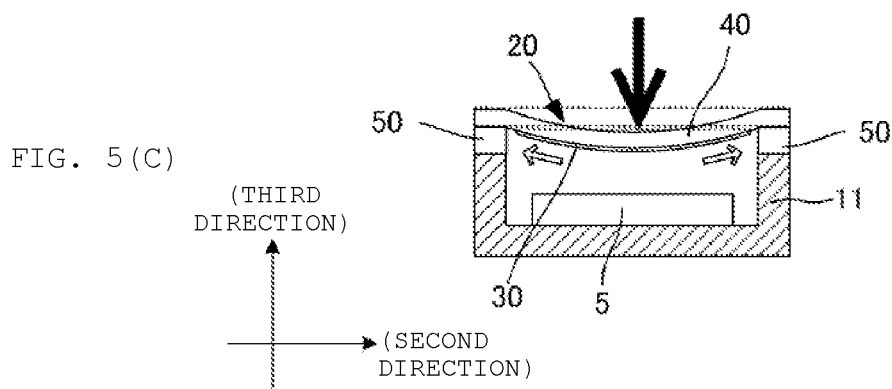
FIG. 5(C) is a cross-sectional view taken along a line F-F' in FIG. 5(A).

For the sake of comparison with the present invention, the manner of deflection when a pressing operation is performed on a panel 20 is described in detail. The panel 20 is formed such that the entire outer peripheral edge portion of a holding member 40 is fixedly adhered to an end edge portion of an opening portion of a casing by an adhesive material having the same modulus of elasticity. Configurations of the panel 20 are equal to corresponding configurations of the panel 21 of the input terminal 101 except for the above-mentioned configuration. FIGS. 5(A) to 5(C) is a conceptual view of the input terminal 100 when a pressing operation is performed on the panel 20 (a first principal surface of a holding member 40). FIG. 5(A) is a perspective view showing an external appearance of the input terminal 101 in a state where a pressing operation is performed on the panel 20 (the first principal surface of the holding member 40), FIG. 5(B) is a cross-sectional view taken along a line E-E' in FIG. 5(A), FIG. 5(C) is a cross-sectional view taken along a line F-F' in FIG. 5(A). In FIGS. 5(A) to 5(C), the structure of the panel 20 is illustrated in a simplified manner for facilitating the understanding of the drawings and the principles. In FIGS. 5(A) to 5(C), an upper side of the drawing corresponds to the operation surface side of the panel 20.

When an external force is applied to a center portion of the panel 20 by pressing, as shown in FIG. 5(B), the holding member 40 of the panel 20 is bent in a valley shape along the long side direction. Along with such bending, a piezoelectric film of a piezoelectric sensor 30 is stretched in the long side direction (first direction) (see a white arrow in FIG. 5(B)). Further, when the external force is applied to the center portion of the panel 20 by pressing, as shown in FIG. 5(C), the holding member 40 of the panel 20 is bent in a valley shape along the short side direction (second direction). Along with such bending, the piezoelectric film of the piezoelectric sensor 30 is stretched also in the short side direction (see a white arrow in FIG. 5(C)). As described above, when the entire outer peripheral edge portion of the holding member are fixedly adhered to the end edge portion of the opening portion of the casing by the adhesive material having the same modulus of elasticity, the piezoelectric film is stretched in two directions (long side direction and short side direction).

Figure 6A:
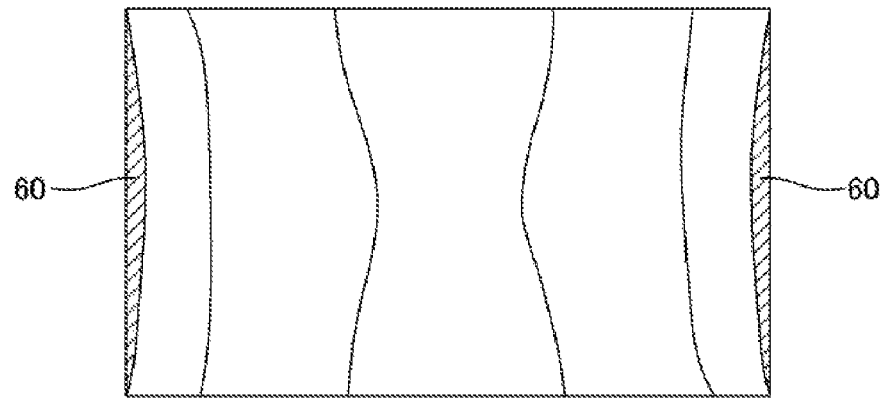
FIG. 6(A) is a conceptual view showing the distribution of voltage generated in a state where a center portion of the panel 21 is being pressed.
Figure 6B:
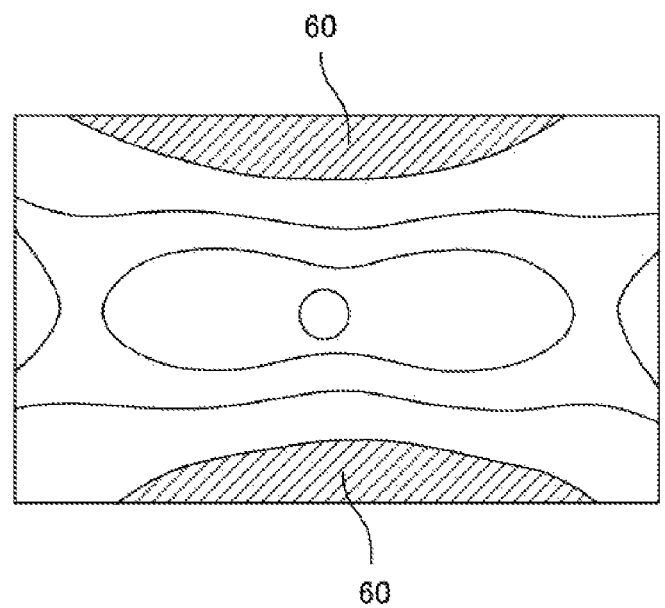
FIG. 6(B) is a conceptual view showing the distribution of voltage generated in a state where a center portion of a panel 20 is being pressed.

The manner of operation and advantageous effects of the present invention are described with reference to drawings. FIG. 6(A) is a conceptual view showing the distribution of voltage generated in a state where the center portion of the panel 21 is being pressed, and FIG. 6(B) is a conceptual view showing the distribution of voltage generated in a state where the center portion of the panel 20 is being pressed. In FIGS. 6(A) and 6(B), regions having different polarities of voltage (charge) (symbol "+" and "−") which are generated due to strain in the piezoelectric film of the piezoelectric sensor when a pressing operation is performed on the panel (the first principal surface of the holding member) are expressed by a white portion and a hatched portion respectively. In this embodiment, a region which has a polarity of voltage different from a polarity of voltage of the white portion is referred to as "region 60 where a polarity of voltage is inverted", and is indicated by the hatched portion in the drawing.

As described previously, the input terminal acquires pressing force information when a pressing operation is performed on the panel (the first principal surface of the holding member) by detecting a voltage (charge) generated due to strains in the piezoelectric film 301 using the piezoelectric voltage detecting electrode 311 and the piezoelectric voltage detecting electrode 312. In this method of detecting a pressing force, however, a pressing force is detected by summing up all voltages (charges) generated corresponding to amounts of strains in the piezoelectric film 301. Accordingly, when the region 60 where a polarity of voltage is inverted exists in the piezoelectric film 301, the generated voltages (charges) are offset each other. Accordingly, pressing force information cannot be accurately detected and hence, detection sensitivity is also lowered. To prevent the lowering of detection sensitivity for detecting pressing force information in view of the above, it is desirable to decrease an area in which the region 60 where a polarity of voltage is inverted is formed.

When a pressing operation is performed on the center portion of the panel 20, as shown in FIG. 6(B), the regions 60 where a polarity of voltage is inverted are largely formed in the piezoelectric film 301 in such a manner that each region extends toward both ends of each long side from the center of each long side. As described above, this is brought about by the stretching of the piezoelectric film in two directions (long side direction and short side direction) (see FIG. 5(B) and FIG. 5(C)). On the other hand, when a pressing operation is performed on the center portion of the panel 21, the piezoelectric film is stretched only in approximately one direction (long side direction) and hence, as shown in FIG. 6(A), the number of polarities of generated voltages in a state where the center portion of the panel 21 is being pressed becomes substantially one. Accordingly, an area of the region 60 where a polarity of voltage is inverted which is formed when a pressing operation is performed on the panel 21 (the first principal surface of the holding member 41) is extremely small compared to a case where a pressing operation is performed on the panel 20 (the first principal surface of the holding member 40).

As described above, according to the configuration of this embodiment, when a pressing operation is performed on the panel 21 (the first principal surface of the holding member 41), the portions of the panel fixed by the adhesive material 51A having a small modulus of elasticity are deformed into approximately the same shape as a case where the panel is pressed in a state where the panel is not fixed to the casing 11. At this stage of operation, the piezoelectric film 301 of the piezoelectric sensor 31 adhered to the holding member 41 is stretched only in approximately one direction and hence, the formation of the region 60 where a polarity of voltage is inverted is suppressed. Accordingly, the lowering of detection sensitivity for detecting pressing force information can be prevented.

Second Embodiment

Figure 7A:
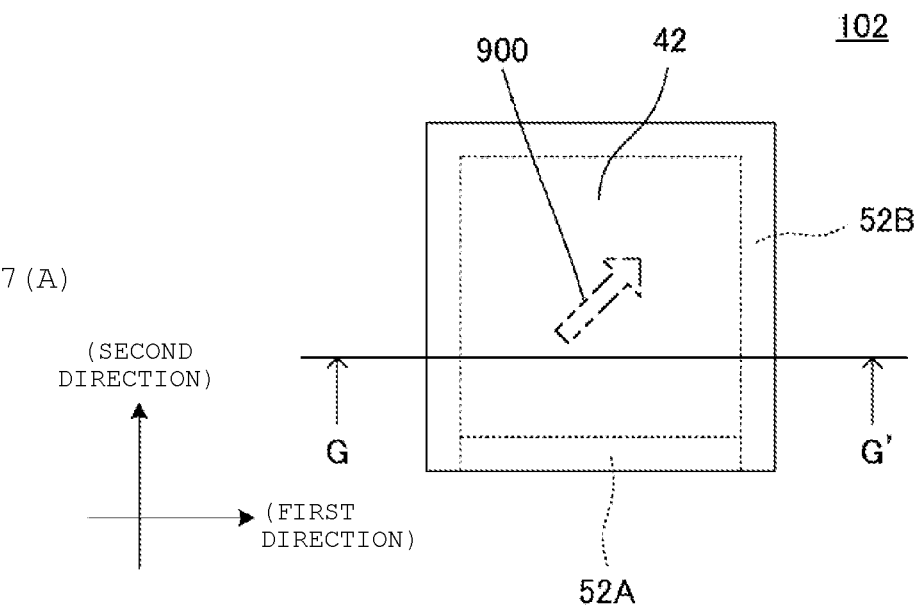
FIG. 7(A) is a plan view showing the structure of the input terminal 102.
Figure 7B:
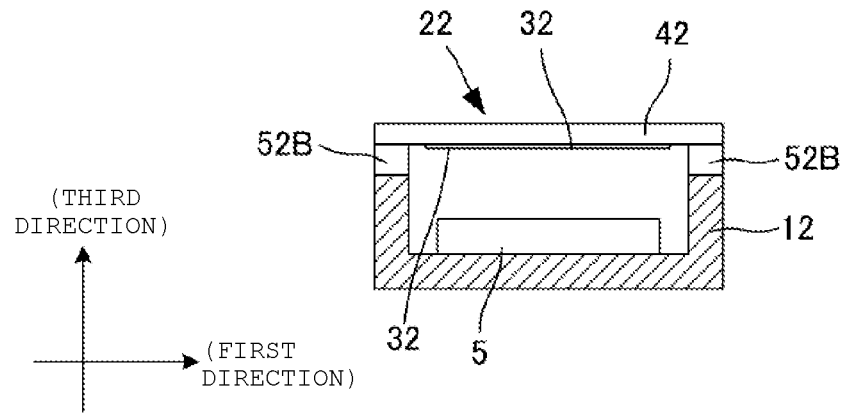
FIG. 7(B) is a cross-sectional view taken along a line G-G' in FIG. 7(A).

Next, an input terminal according to a second embodiment is described with reference to drawings. FIGS. 7(A) and 7(B) is a view for describing the structure of an input terminal 102 according to the second embodiment. FIG. 7(A) is a plan view showing the structure of the input terminal 102, and FIG. 7(B) is a cross-sectional view taken along a line G-G' in FIG. 7(A). To summarize this embodiment, the input terminal 102 of this embodiment includes a square-shaped panel 22.

The input terminal 102 includes: a casing 12; a panel 22; a circuit board 5; an adhesive material 52A; and an adhesive material 52B. The panel 22 is formed by combining a piezoelectric sensor 32 and a holding member 42 with each other. Although the panel 22 has a square shape, configurations of the panel 22 of the second embodiment are equal to corresponding configurations of the piezoelectric sensor 31 according to the first embodiment except for the shape.

The input terminal 102 is formed such that an opening portion of the casing 12 is covered by the holding member 42 (panel 22) in a state where the piezoelectric sensor 32 is accommodated in the inside of the casing 12. An entire outer peripheral edge portion of the holding member 42 is fixedly adhered to an end edge portion of the opening portion of the casing 12 by two kinds of adhesive materials, that is, the adhesive material 52A and the adhesive material 52B. The adhesive material 52A is an adhesive material provided for fixedly adhering one side of the outer peripheral edge portion of the square-shaped holding member 42 to a portion of the end edge portion of the opening portion of the casing 12. The adhesive material 52B is an adhesive material provided for fixedly adhering three other sides of the outer peripheral edge portion of the square-shaped holding member 42 to portions of the end edge portion of the opening portion of the casing 12. A modulus of elasticity of the adhesive material 52A is smaller than a modulus of elasticity of the adhesive material 52B. Accordingly, in this embodiment, when a pressing operation is performed on the panel 22 (a first principal surface of the holding member 42), one side of the square-shaped holding member 42 is easily deflectable compared to other sides of the square-shaped holding member 42.

FIGS. 8(A) and 8(B) shows a model for acquiring a voltage characteristic of voltages generated when a pressing operation is performed on the panel (the first principal surface of the holding member) of a square-shaped input terminal by simulation. FIGS. 8(A) and 8(B) and FIG. 9 show models of two input terminals which are objects to be compared. FIG. 8(A) is a plan view of an input terminal 102S which is a simulation model, and FIG. 8(B) is a cross-sectional view taken along a line H-H' in FIG. 8(A). FIG. 9 is a plan view of an input terminal 102T which is a simulation model.

Sizes of respective portions of the models are as follows.
size of holding member: W110 mm×L110 mm×H550 μm
size of PLLA: W100 mm×L100 mm×H50 μm
size of OCA (Optical Clear Adhesive): W100 mm×L100 mm×H100 μm
pitch of pressing points in X direction: 40 mm
pitch of pressing points in Y direction: 40 mm FIG. 10(A) is a graph showing amounts of voltages generated in a state where the panel of the input terminal 102S is being pressed, and FIG. 10(B) is a graph showing amounts of voltages generated in a state where the panel of the input terminal 102T is being pressed.

The input terminal 102S has substantially the same configuration as the input terminal 102, and includes: a casing 12; a panel 22S; an adhesive material 52SA; and an adhesive material 52SB. The panel 22S is formed by combining a piezoelectric film 302 which is formed using PLLA, an adhesive sheet 332, and a holding member 42S with each other. The adhesive sheet 332 is formed using OCA (Optical Clear Adhesive), for example.

The input terminal 102S is formed such that an opening portion of the casing 12 is covered by the holding member 42S (panel 22S) in a state where the piezoelectric film 302 is accommodated in the inside of the casing 12. An entire outer peripheral edge portion of the holding member 42S is fixedly adhered to an end edge portion of the opening portion of the casing 12 by the adhesive material 52SA and the adhesive material 52SB. The adhesive material 52SA is an adhesive material provided for fixedly adhering one side of the square-shaped holding member 42S to a portion of the opening portion of the casing 12. The adhesive material 52B is an adhesive material provided for fixedly adhering three other sides of the square-shaped holding member 42S to portions of the opening portion of the casing 12. A modulus of elasticity of the adhesive material 52SA is smaller than a modulus of elasticity of the adhesive material 52SB. On the other hand, the input terminal 102T is configured such that all sides of a holding member are fixedly adhered to an opening portion of a casing by an adhesive material 52T having the same modulus of elasticity. Other configurations of the input terminal 102T are equal to the corresponding configurations of the input terminal 102S.

Figure 10A:
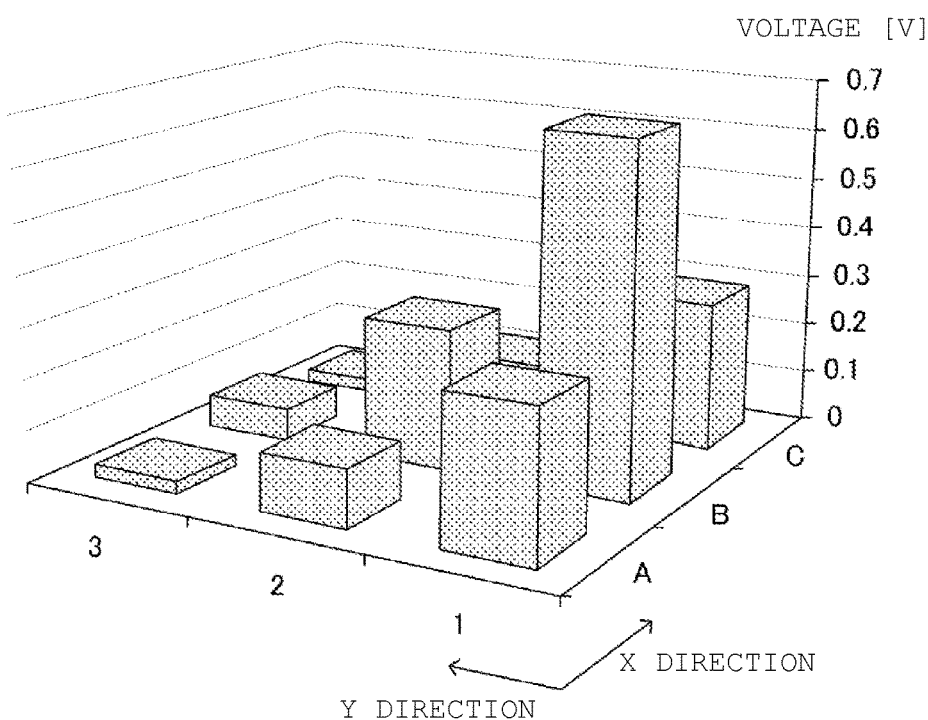
FIG. 10(A) is a graph showing an amount of voltage generated in a state where a panel of the input terminal 102S is being pressed.
Figure 10B:
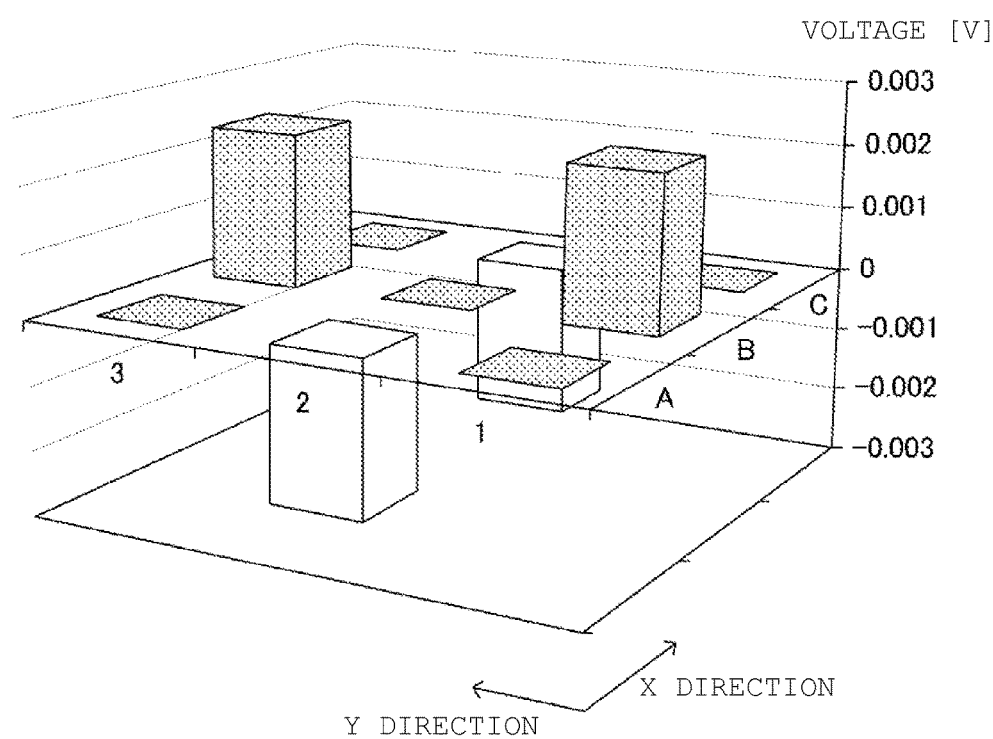
FIG. 10(B) is a graph showing an amount of voltage generated in a state where a panel of the input terminal 102T is being pressed.

FIG. 10(A) and FIG. 10(B) are graphs showing a result obtained by calculating a total amount of voltages detected at respective pressing points (1A, 1B, 1C, 2A, 2B, 2C, 3A, 3B, 3C) on the input terminal 102S shown in FIG. 8(A) when the respective pressing points are sequentially pressed, and a result obtained by calculating a total amount of voltages detected at respective pressing points (1A, 1B, 1C, 2A, 2B, 2C, 3A, 3B, 3C) on the input terminal 102T shown in FIG. 9 when the respective pressing points are sequentially pressed. The pressing points and the positions of detection points for detecting amounts of voltages are disposed at the same positions.

When the pressing points (1A, 1B, 1C, 2A, 2B, 2C, 3A, 3B, 3C) on the input terminal 102T are sequentially pressed, as shown in FIG. 10(B), voltages generated in the piezoelectric film has two polarities (symbol "+" and "−") so that regions where a polarity of voltage is inverted are formed. Further, it can be understood that a total absolute value of voltages having a polarity "+" are substantially equal to a total absolute value of voltages having a polarity "−" and hence, generated voltages (charge) offset each other whereby detection sensitivity for detecting pressing force information is remarkably lowered. On the other hand, when the pressing points (1A, 1B, 1C, 2A, 2B, 2C, 3A, 3B, 3C) on the input terminal 102S are sequentially pressed, as shown in FIG. 10(A), voltages generated at all pressing points have only one polarity (only "+"). Further, it can be understood that a total absolute value of voltages generated when the input terminal 102S is pressed is larger than a total absolute value of voltages generated when the input terminal 102T is pressed.

As described above, even in the case where the input terminal has the square-shaped panel, as in the case of this embodiment, by setting a modulus of elasticity of the adhesive material provided for fixedly adhering at least one side of the panel smaller than a modulus of elasticity of the adhesive material provided for fixedly adhering other sides of the panel, when a pressing operation is performed on the panel 22 (the first principal surface of the holding member 42), the piezoelectric film can be stretched only in approximately one direction and hence, the formation of the regions where a polarity of voltage is inverted is suppressed. Accordingly, the lowering of detection sensitivity for detecting pressing force information can be prevented.

In this embodiment, the example of the input terminal which includes the square-shaped panel is described. However, the input terminal is not limited to such configuration and the configuration of the input terminal may be suitably changed. For example, the input terminal may have a polygonal shape, a circular shape or the like. Also in such cases, by making a modulus of elasticity of at least a portion of an adhesive material and a modulus of elasticity of a remaining portion of the adhesive material differ from each other, the formation of regions where a polarity of voltage is inverted is suppressed. Accordingly, the lowering of detection sensitivity for detecting pressing force information can be prevented.

Third Embodiment

Figure 11:
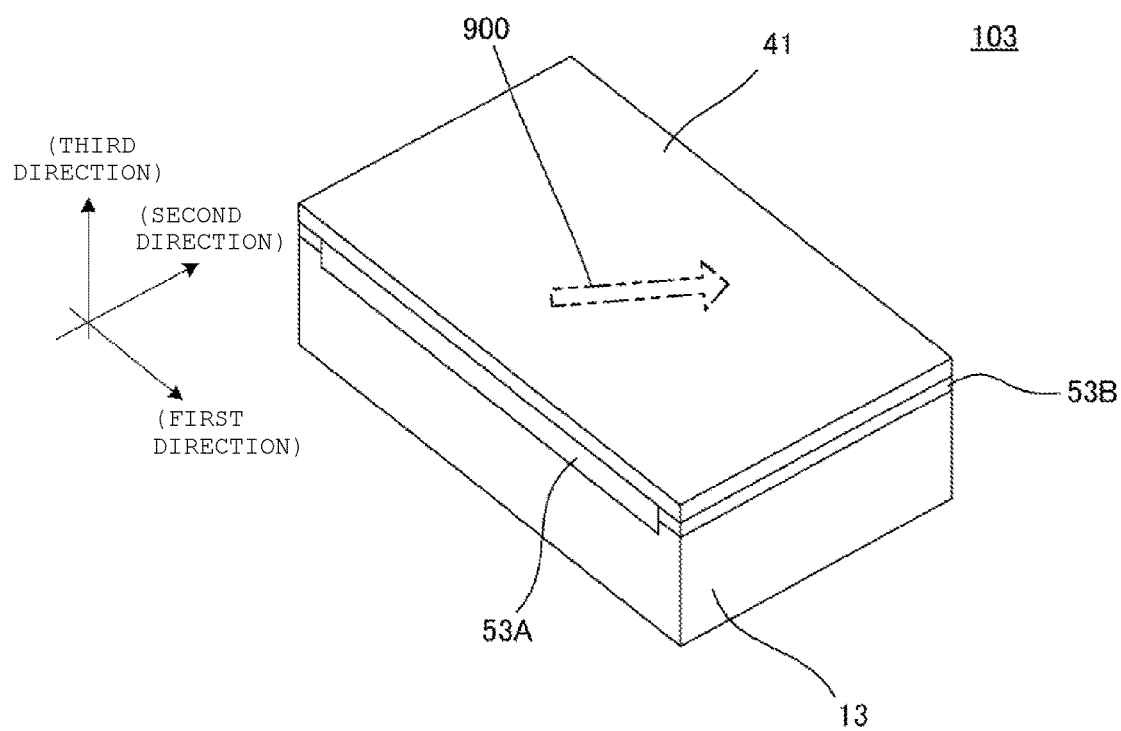
FIG. 11 is a perspective view showing an external appearance of an input terminal 103 according to a third embodiment.
Figure 12A:
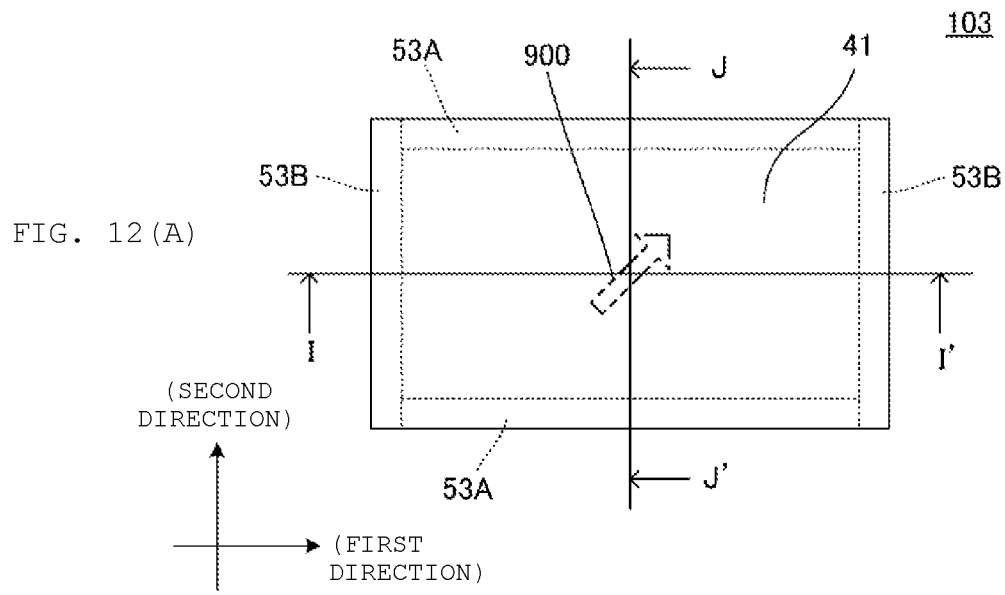
FIG. 12(A) is a plan view showing the structure of the input terminal 103.
Figure 12B:
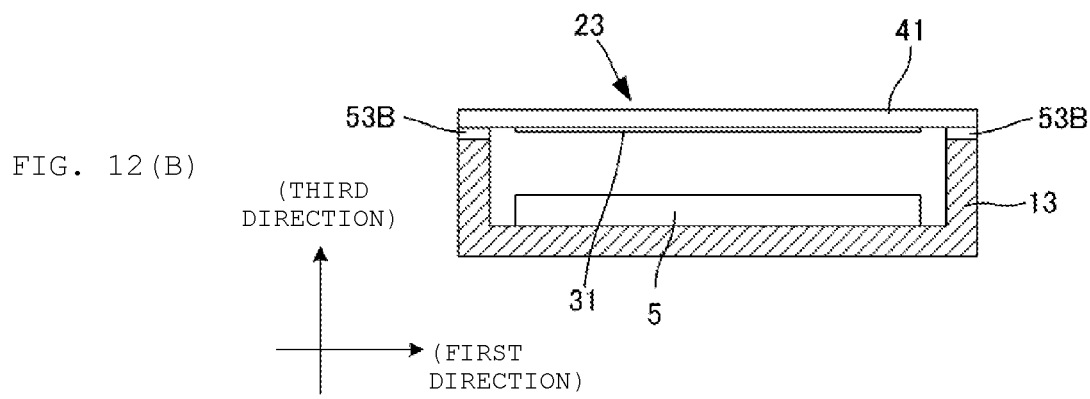
FIG. 12(B) is a cross-sectional view taken along a line I-I' in FIG. 12(A)
Figure 12C:
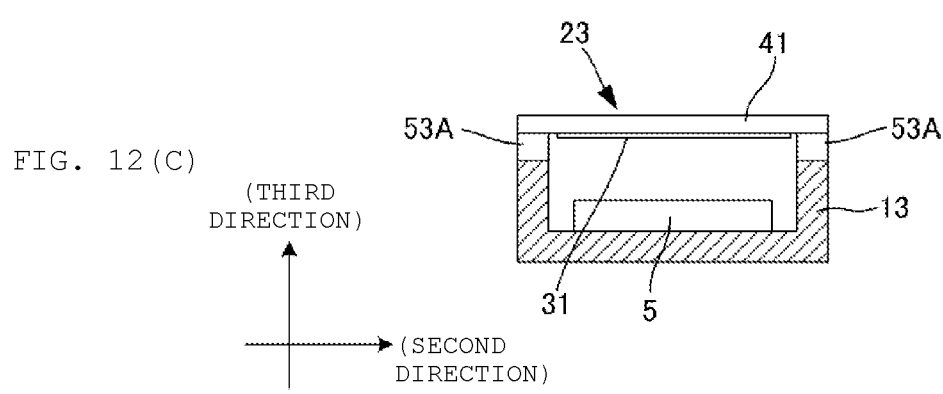
FIG. 12(C) is a cross-sectional view taken along a line J-J' in FIG. 12(A).

An input terminal according to a third embodiment is described with reference to drawings. FIG. 11 is a perspective view showing an external appearance of an input terminal 103 according to the third embodiment. FIGS. 12(A) to 12(C) is a view for describing the structure of the input terminal 103 according to the third embodiment. FIG. 12(A) is a plan view showing the structure of the input terminal 103, FIG. 12(B) is a cross-sectional view taken along a line I-I' in FIG. 12(A), and FIG. 12(C) is a cross-sectional view taken along a line J-J' in FIG. 12(A). To summarize this embodiment, the input terminal 103 according to this embodiment is configured such that a thickness of a portion of an adhesive material and a thickness of a remaining portion of the adhesive material differ from each other.

The input terminal 103 includes: a casing 13; a panel 23; a circuit board 5; adhesive materials 53A; and adhesive materials 53B. The adhesive materials 53A and the adhesive materials 53B are adhesive materials provided for fixedly adhering an entire outer peripheral edge portion of the rectangular holding member 41 to an opening portion of the casing 13. The adhesive materials 53A are adhesive materials provided for fixedly adhering two long sides of the rectangular holding member 41 to portions of the opening portion of the casing 13. The adhesive materials 53B are adhesive materials provided for fixedly adhering two short sides of the rectangular holding member 41 to portions of the opening portion of the casing 13. In this embodiment, a distance from an outer peripheral edge portion of the holding member 41 to an end edge portion of the opening portion of the casing 13 is a "thickness" of the adhesive material (a distance in the third direction in FIGS. 12(A) to 12(C)). In the input terminal 103, a thickness of the adhesive material 53A is set larger than a thickness of the adhesive material 53B. Configurations of the input terminal 103 are substantially equal to corresponding configurations of the input terminal 101 according to the first embodiment except for the thicknesses of the adhesive materials 53A, 53B.

Next, the manner of deflection of the panel 21 (a first principal surface of the holding member 41) when a pressing operation is performed on the panel 21 is described in detail. A thickness of the adhesive material 53B is smaller than a thickness of the adhesive material 53A and hence, when a pressing operation is performed on the panel 23 (the first principal surface of the holding member 41), a range within which the panel 23 can be deflected in the pressing direction is small. That is, when a pressing force which is applied to the panel 23 is gradually increased, both short sides and long sides of the holding member 41 are deflected. However, after a fixed amount of pressing force is applied to the panel 23, firstly, the short sides of the panel 23 which are fixedly adhered to the opening portion of the casing by the adhesive material having a small thickness become no more deflectable and, then, when the pressing force is further applied to the panel 23, only the long sides of the panel 23 which are fixedly adhered to the opening portion of the casing by the adhesive material having a large thickness are forcibly deflected.

Accordingly, when a pressing operation is performed on the panel 23 (the first principal surface of the holding member 41), two long sides of the rectangular holding member 41 are forcibly largely deflected compared to two short sides of the rectangular holding member 41. With such a configuration, when a pressing operation is performed on the panel 23 (the first principal surface of the holding member 41), the panel 23 is deformed into approximately the same shape as the case where a pressing operation is performed on the panel 21 (the first principal surface of the holding member 41) of the input terminal 101 according to the first embodiment (see FIGS. 4(A) to 4(C)). That is, the panel 23 is deformed into approximately the same shape as the case where a pressing operation is performed on the panel (the first principal surface of the holding member) in a state where the outer peripheral edge portions of two short sides of the rectangular holding member are fixedly adhered to the end edge portion of the opening portion of the casing by the adhesive material and the outer peripheral edge portions of two long sides of the holding member are not fixedly adhered to the end edge portion of the opening portion of the casing.

As described above, according to the configuration of this embodiment, when a pressing operation is performed on the panel 23 (the first principal surface of the holding member 41), two long sides of the rectangular holding member 41 are forcibly largely deflected compared to two short sides of the rectangular holding member 41. Accordingly, when a pressing operation is performed on the panel 23 (the first principal surface of the holding member 41), the piezoelectric film can be stretched only in approximately one direction (long side direction) and hence, the formation of regions where a polarity of voltage is inverted is suppressed. Accordingly, the lowering of detection sensitivity for detecting pressing force information can be prevented.

Even in the case where the panel has a square shape, by setting a thickness of an adhesive material provided for fixedly adhering one side of the square-shaped holding member to a portion of the opening portion of the casing larger than a thickness of adhesive materials provided for fixedly adhering other three sides of the square-shaped holding member to portions of the opening portion of the casing, substantially the same advantageous effect can be acquired. That is, when a pressing operation is performed on the panel (the first principal surface of the holding member), only one side of the square-shaped holding member is largely deflected compared to other sides of the square-shaped holding member. Accordingly, in the same manner as the second embodiment, the formation of regions where a polarity of voltage is inverted which is generated due to strain in the piezoelectric sensor (piezoelectric film) is suppressed. Accordingly, the lowering of detection sensitivity for detecting pressing force information can be prevented.

A shape of the panel is not limited to a rectangular shape or a square shape, and may be changed as desired. For example, even when the panel has a polygonal shape, a circular shape or the like, by making a thickness of at least a portion of the adhesive material and a thickness of a remaining portion of the adhesive material differ from each other, the formation of regions where a polarity of voltage is inverted is suppressed. Accordingly, the lowering of detection sensitivity for detecting pressing force information can be prevented.

Fourth Embodiment

Figure 13:
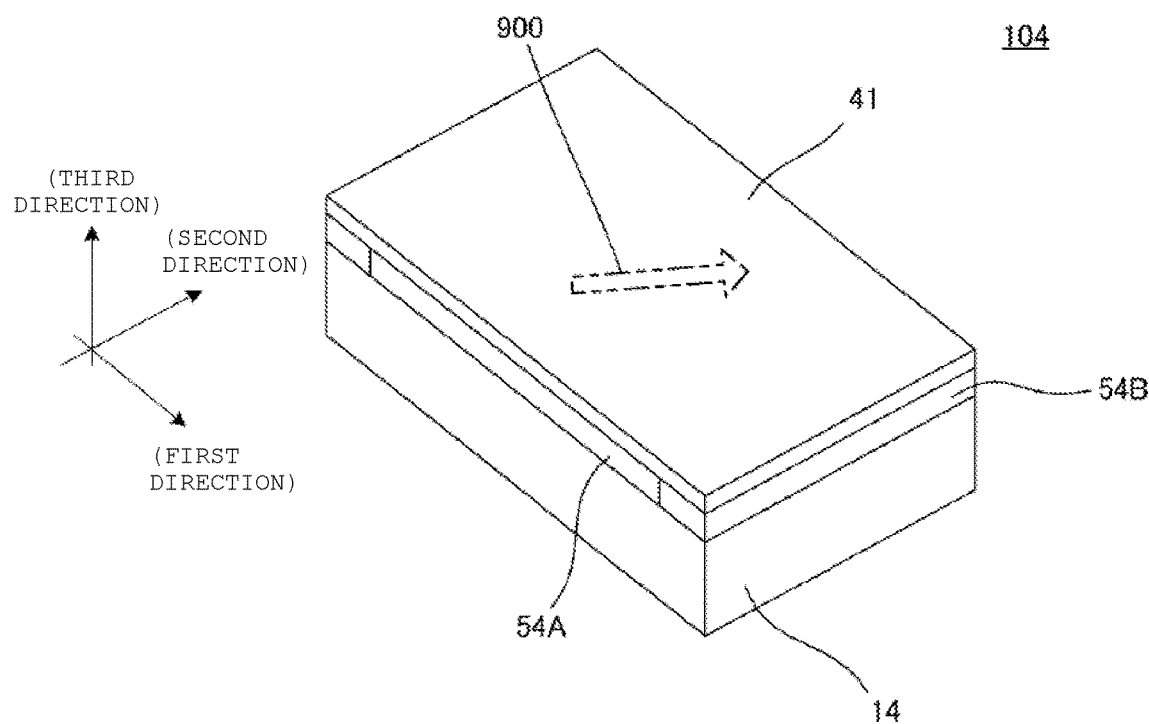
FIG. 13 is a perspective view showing an external appearance of an input terminal 104 according to a fourth embodiment.
Figure 14A:
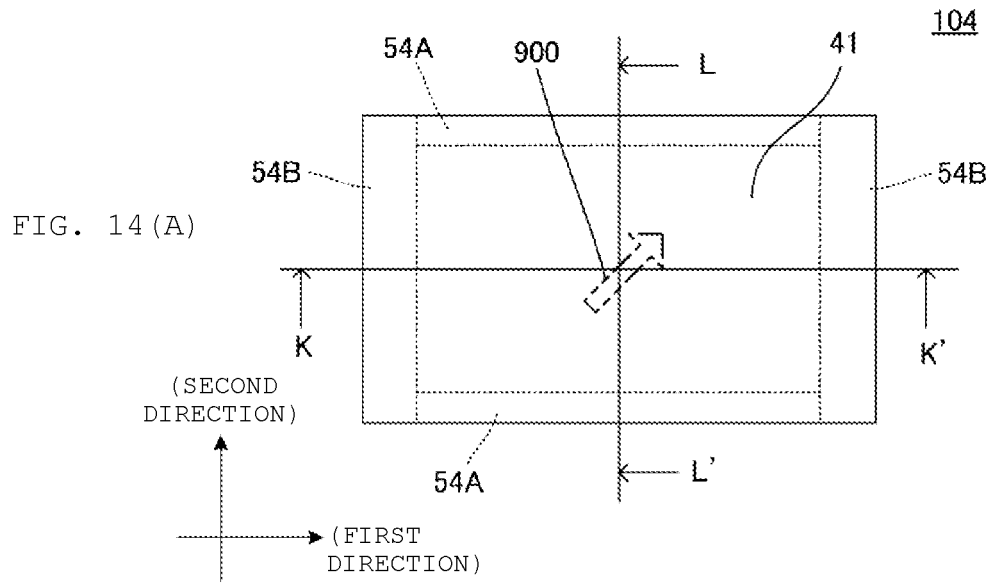
FIG. 14(A) is a plan view showing the structure of the input terminal 104.
Figure 14B:
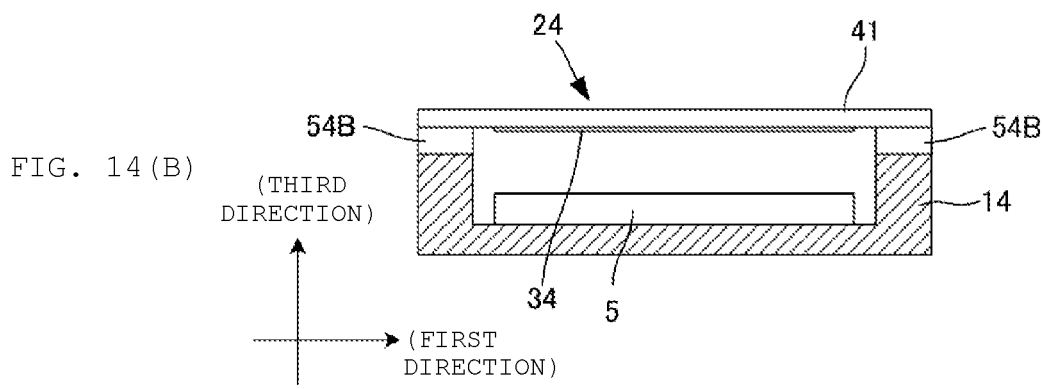
FIG. 14(B) is a cross-sectional view taken along a line K-K' in FIG. 14(A)
Figure 14C:
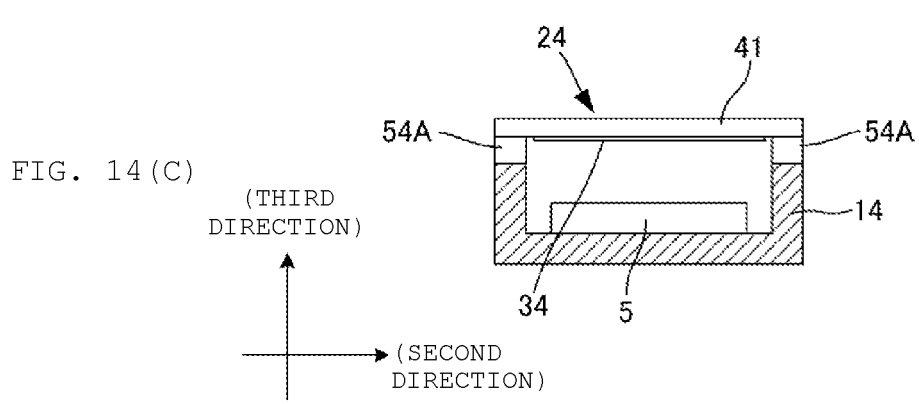
FIG. 14(C) is a cross-sectional view taken along a line L-L' in FIG. 14(A).

An input terminal according to a fourth embodiment is described with reference to drawings. FIG. 13 is a perspective view showing an external appearance of an input terminal 104 according to the fourth embodiment. FIGS. 14(A) to 14(C) is a view for describing the structure of the input terminal 104 according to the fourth embodiment. FIG. 14(A) is a plan view showing the structure of the input terminal 104, FIG. 14(B) is a cross-sectional view taken along a line K-K' in FIG. 14(A), and FIG. 14(C) is a cross-sectional view taken along a line L-L' in FIG. 14(A). In FIGS. 14(A) to 14(C), the structure of the panel 24 is illustrated in a simplified manner for facilitating the understanding of the drawing and the principle. To summarize this embodiment, the input terminal 104 according to this embodiment is configured such that a width of a portion of the adhesive material and a width of a remaining portion of the adhesive material differ from each other.

The input terminal 104 includes: a casing 14; a panel 24; a circuit board 5; adhesive materials 54A; and adhesive materials 54B. The panel 24 is formed by combining a piezoelectric sensor 34 and a holding member 41 with each other. The adhesive materials 54A and the adhesive materials 54B are adhesive materials provided for fixedly adhering an entire outer peripheral edge portion of the rectangular holding member 41 to an opening portion of the casing 14. The adhesive materials 54A are adhesive materials provided for fixedly adhering two long sides of the rectangular holding member 41 to portions of the opening portion of the casing 14. The adhesive materials 54B are adhesive materials provided for fixedly adhering two short sides of the rectangular holding member 41 to portions of the opening portion of the casing 14. In this embodiment, a distance between an inner peripheral edge and an outer peripheral edge of the adhesive material is a "width" of the adhesive material (a distance in the first direction or the second direction in FIGS. 14(A) to 14(C)). In the input terminal 104, the width of the adhesive material 54B is set larger than the width of the adhesive material 54A. Configurations of the input terminal 104 are substantially equal to corresponding configurations of the input terminal 101 according to the first embodiment except for the widths of the adhesive materials 54A, 54B.

Next, the manner of deflection of the panel 24 (the first principal surface of the holding member 41) when a pressing operation is performed on the panel 24 is described in detail. A width of the adhesive material 54B is set larger than a width of the adhesive material 51B of the input terminal 101 according to the first embodiment and hence, when the panel is viewed in a plan view, an area of the adhesive material 54B is also larger than an area of the adhesive material 51B. A stress ($\sigma$=F/S) is inversely proportional to an area S and hence, the larger the area S, the smaller an elastic deformation amount (=strain $\varepsilon$, $\varepsilon$=$\sigma$·E) becomes. Accordingly, an elastic deformation amount of the adhesive material 54B having a large width and a large area is small compared to an elastic deformation amount of the adhesive material 54A. Accordingly, in this embodiment, in the same manner as the first embodiment, when a pressing operation is performed on the panel 21 (the first principal surface of the holding member 41), two long sides of the rectangular holding member 41 are easily deflectable compared to two short sides of the rectangular holding member 41. Accordingly, when a pressing operation is performed on the panel 24 (the first principal surface of the holding member 41), the panel 24 is deformed into approximately the same shape as a case where a pressing operation is performed on the panel 21 (the first principal surface of the holding member 41) of the input terminal 101 according to the first embodiment (see FIGS. 4(A) to 4(C)). That is, the panel 24 is deformed into approximately the same shape as a case where a pressing operation is performed on the panel (the first principal surface of the holding member) in a state where the outer peripheral edge portions of two short sides of the rectangular holding member are fixedly adhered to the end edge portion of the opening portion of the casing by the adhesive materials and the outer peripheral edge portions of two long sides of the holding member are not fixedly adhered to the end edge portion of the opening portion of the casing.

As described above, according to the configuration of this embodiment, when a pressing operation is performed on the panel 24 (the first principal surface of the holding member 41), two long sides of the rectangular holding member 41 are largely deflected compared to two short sides of the rectangular holding member 41. Accordingly, when a pressing operation is performed on the panel 24 (the first principal surface of the holding member 41), a piezoelectric film can be stretched only in approximately one direction (long side direction) and hence, the formation of regions where a polarity of voltage is inverted is suppressed. Accordingly, the lowering of detection sensitivity for detecting pressing force information can be prevented.

Even in the case where the panel has a square shape, by setting a width of the adhesive material provided for fixedly adhering at least one side of the square-shaped holding member to a portion of the opening portion of the casing smaller than a width of the adhesive materials provided for fixedly adhering other three sides of the square-shaped holding member to portions of the opening portion of the casing, substantially the same advantageous effect can be acquired. That is, when a pressing operation is performed on the panel (the first principal surface of the holding member), at least one side of the square-shaped holding member is largely deflected compared to other sides of the square-shaped holding member. Accordingly, in the same manner as the second embodiment, the formation of regions where a polarity of voltage is inverted which is generated due to strain in the piezoelectric sensor (piezoelectric film) is suppressed. Accordingly, the lowering of detection sensitivity for detecting pressing force information can be prevented.

A shape of the panel is not limited to a rectangular shape or a square shape, and may be changed as desired. For example, even when the panel has a polygonal shape, a circular shape or the like, by making a width of at least a portion of the adhesive material and a width of remaining portions of the adhesive material differ from each other, the formation of regions where a polarity of voltage is inverted is suppressed. Accordingly, the lowering of detection sensitivity for detecting pressing force information can be prevented.

Fifth Embodiment

Figure 15:
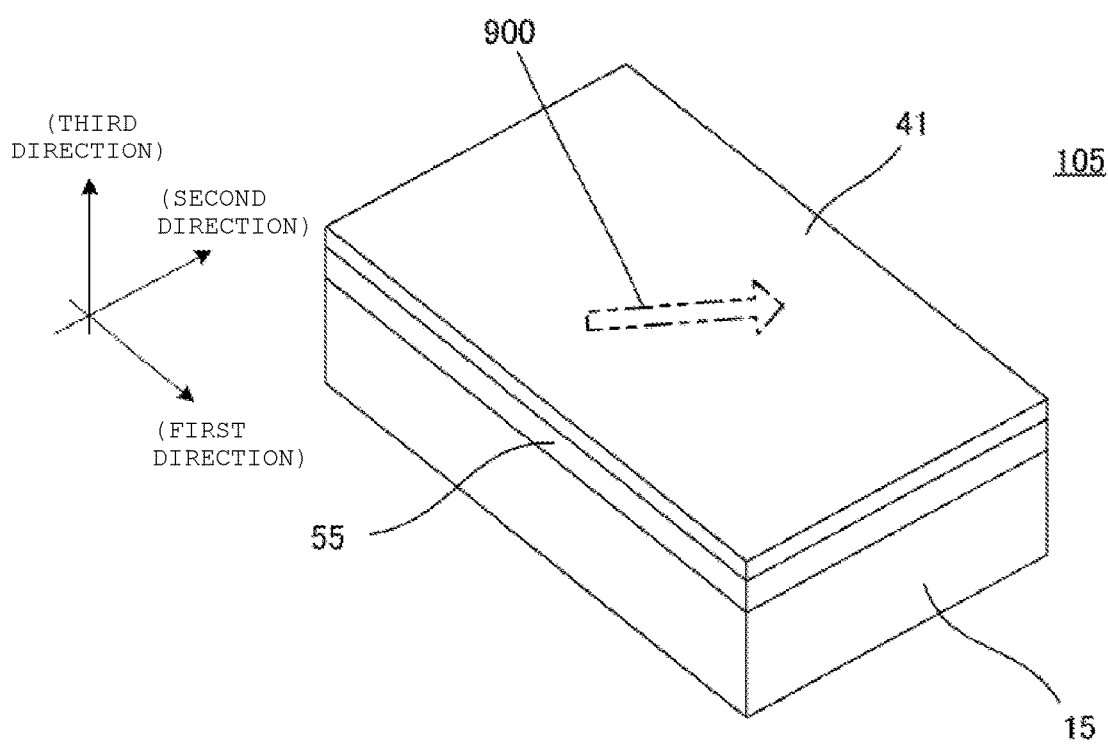
FIG. 15 is a perspective view showing an external appearance of an input terminal 105 according to a fifth embodiment.
Figure 16A:
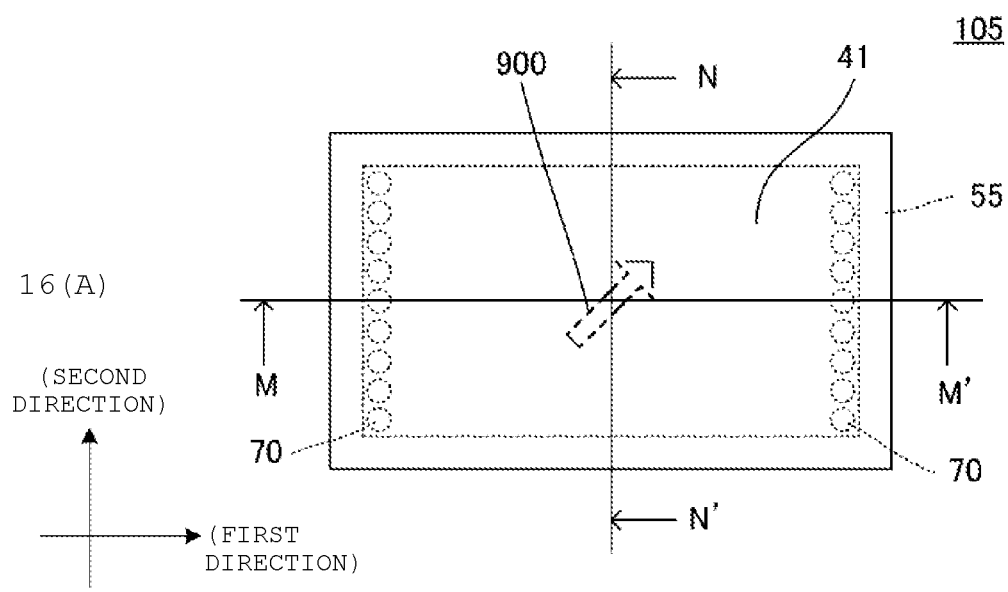
FIG. 16(A) is a plan view showing the structure of the input terminal 105.
Figure 16B:
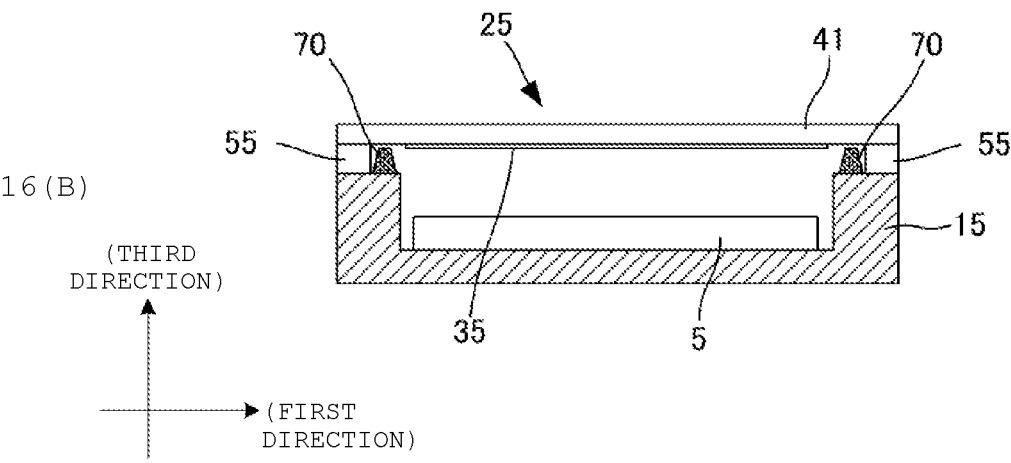
FIG. 16(B) is a cross-sectional view taken along a line M-M' in FIG. 16(A)
Figure 16C:
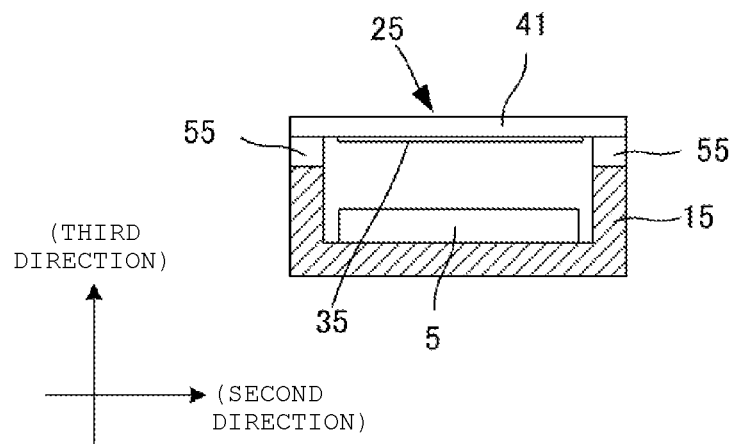
FIG. 16(C) is a cross-sectional view taken along a line N-N' in FIG. 16(A).

An input terminal according to a fifth embodiment is described with reference to drawings. FIG. 15 is a perspective view showing an external appearance of an input terminal 105 according to the fifth embodiment. FIGS. 16(A) to 16(C) is a view for describing the structure of the input terminal 105 according to the fifth embodiment. FIG. 16(A) is a plan view showing the structure of the input terminal 105, FIG. 16(B) is a cross-sectional view taken along a line M-M' in FIG. 16(A), and FIG. 16(B) is a cross-sectional view taken along a line N-N' in FIG. 16(A). In FIGS. 16(A) to 16(C), the structure of a panel 25 is illustrated in a simplified manner for facilitating the understanding of the drawing and the principle. To summarize this embodiment, the input terminal 105 according to this embodiment is configured such that deformation obstructing members 70 are disposed in the inside of a casing and at positions close to an inner periphery of an adhesive material. The deformation obstructing members 70 obstruct the deformation of a holding member when a pressing operation is performed on a principal surface of the holding member.

The input terminal 105 includes: a casing 15; the panel 25; a circuit board 5; the adhesive material 55; and the deformation obstructing members 70. The panel 25 is formed by combining a piezoelectric sensor 35 and the holding member 41 with each other. The adhesive material 55 is an adhesive material provided for fixedly adhering an entire peripheral edge portion of the rectangular holding member 41 to an opening portion of the casing 15.

The deformation obstructing members 70 are provided for obstructing the deformation of the holding member 41 when a pressing operation is performed on the panel 25 (the first principal surface of the holding member 41), and are disposed in the inside of the casing 15 along the adhesive material 55 provided for fixedly adhering two short sides of the holding member 41 to the opening portion of the casing. The deformation obstructing members 70 are also disposed close to the inner periphery of the adhesive material 55. In this embodiment, the deformation obstructing members 70 are semispherical projections made of aluminum (Al), for example. Each deformation obstructing member 70 is adhered to the casing 15 by an adhesive agent not shown in the drawing such that a spherical surface side of the deformation obstructing member 70 opposedly faces the holding member 41.

Figure 17A:
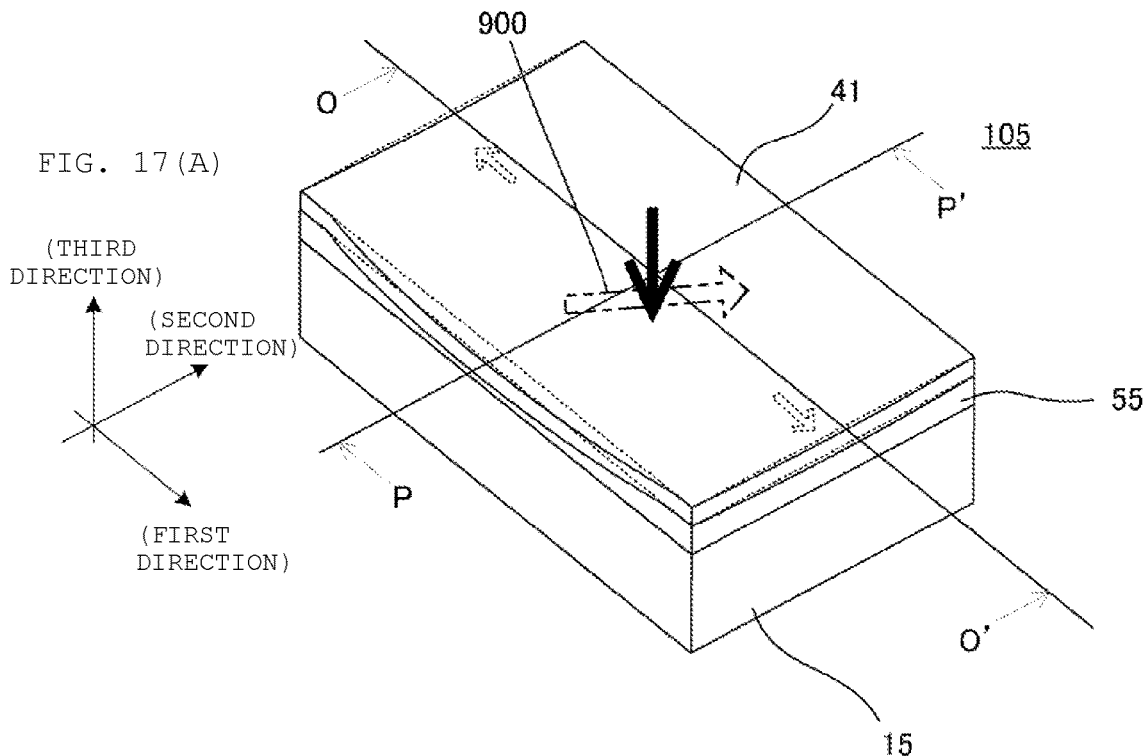
FIG. 17(A) is a perspective view showing an external appearance of the input terminal 105 according to the fifth embodiment in a state where a pressing operation is performed on a panel 25.
Figure 17B:
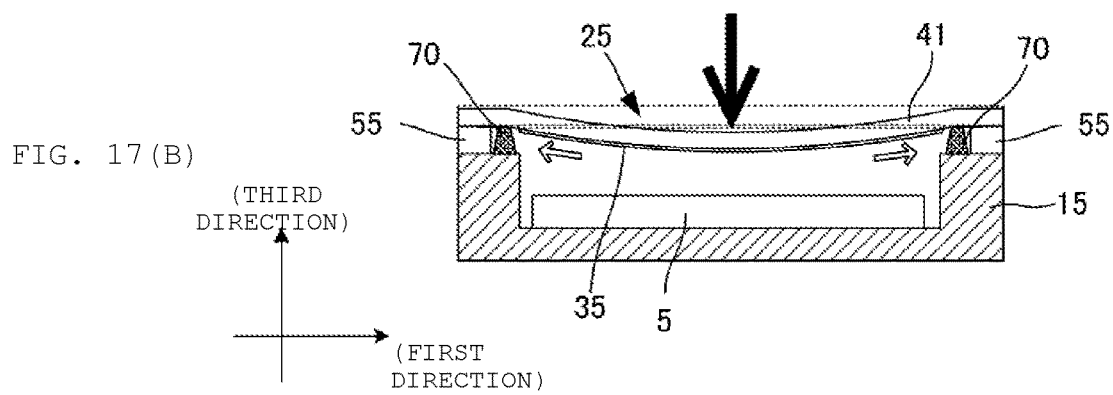
FIG. 17(B) is a cross-sectional view taken along a line O-O' in FIG. 4(A)
Figure 17C:
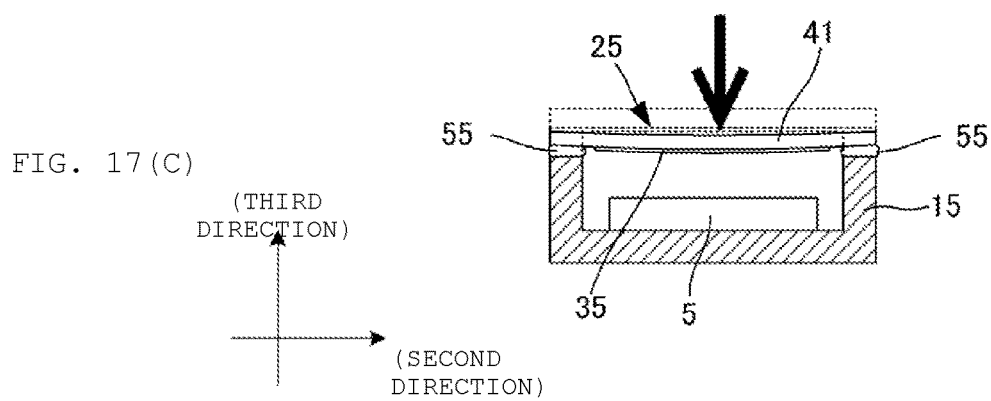
FIG. 17(C) is a cross-sectional view taken along a line P-P' in FIG. 17(A).

Next, the manner of deflection of the panel 25 (the first principal surface of the holding member 41) when a pressing operation is performed on the panel 25 is described in detail. FIGS. 17(A) to 17(C) is a conceptual view of the input terminal 105 according to the fifth embodiment in a state where a pressing operation is performed on the panel 25 (a first principal surface of a holding member 41). FIG. 17(A) is a perspective view showing an external appearance of the input terminal 105 according to the fifth embodiment in a state where a pressing operation is performed on the panel 25 (the first principal surface of the holding member 41), FIG. 17(B) is a cross-sectional view taken along a line O-O' in FIG. 17(A), and FIG. 4(C) is a cross-sectional view taken along a line P-P' in FIG. 4(A). In FIGS. 17(A) to 17(C), the structure of the panel 25 is illustrated in a simplified manner for facilitating the understanding of the drawing and the principle. In FIGS. 17(A) to 17(C), an upper side of the drawing corresponds to an operation surface side of the panel 21.

As described above, the deformation obstructing members 70 are disposed at positions close to the inner periphery of the adhesive material 55 provided for fixedly adhering two short sides of the holding member 41 to portions of the opening portion of the casing. With such a configuration, when a pressing operation is performed on the panel 25 (a first principal surface of the holding member 41), a range within which the panel 25 can be deflected in the pressing direction is small. That is, when a pressing force which is applied to the panel 25 is gradually increased, both short sides and long sides of the holding member 41 are deflected. However, at a stage where a fixed amount of pressing force is applied to the panel 25, the short sides of the holding member 41 are brought into contact with the deformation obstructing members 70 and hence, the short sides of the holding member 41 become no more deflectable (see FIG. 17(B)). When a pressing force is further applied to the panel 25 after a fixed amount of pressing force is applied to the panel 25, only the long sides of the panel 25 are forcibly deflected.

Accordingly, when a pressing operation is performed on the panel 25 (the first principal surface of the holding member 41), two long sides of the rectangular holding member 41 are forcibly largely deflected compared to two short sides of the rectangular holding member 41. Accordingly, when a pressing operation is performed on the panel 25 (the first principal surface of the holding member 41), the panel 25 is deformed into approximately the same shape as a case where a pressing operation is performed on the panel 21 (the first principal surface of the holding member 41) of the input terminal 101 according to the first embodiment (see FIGS. 4(A) to 4(C) and FIGS. 17(A) to 17(C)). That is, the panel 25 is deformed into approximately the same shape as a case where a pressing operation is performed on the panel (the first principal surface of the holding member) in a state where the outer peripheral edge portions of two short sides of the rectangular holding member are fixedly adhered to the end edge portion of the opening portion of the casing by the adhesive materials and the outer peripheral edge portions of two long sides of the holding member are not fixedly adhered to the end edge portion of the opening portion of the casing.

As described above, according to the configuration of this embodiment, when a pressing operation is performed on the panel 25 (the first principal surface of the holding member 41), two long sides of the rectangular holding member 41 are forcibly largely deflected compared to two short sides of the rectangular holding member 41. Accordingly, when a pressing operation is performed on the panel (the first principal surface of the holding member), a piezoelectric film can be stretched only in approximately one direction (long side direction) and hence, the formation of regions where a polarity of voltage is inverted is suppressed. Accordingly, the lowering of detection sensitivity for detecting pressing force information can be prevented.

In this embodiment, the entire outer peripheral edge portion of the rectangular holding member 41 is fixedly adhered to the opening portion of the casing 15 by the adhesive material 55. However, the configuration of the input terminal 105 is not limited to such a configuration. Provided that two long sides of the rectangular holding member 41 can be forcibly largely deflected compared to two short sides of the rectangular holding member 41 when a pressing operation is performed on the panel 25 (the first principal surface of the holding member 41), an adhesive material having a different modulus of elasticity may be used as a part of the adhesive material.

Even in the case where the panel has a square shape, by not disposing the deformation obstructing members in the inside of the casing 15 and at positions close to the inner periphery of the adhesive material provided for fixedly adhering at least one side of the square-shaped holding member to the opening portion of the casing, substantially the same advantageous effect can be acquired. That is, when a pressing operation is performed on the panel (the first principal surface of the holding member), at least one side of the square-shaped holding member is largely deflected compared to other sides of the square-shaped holding member. Accordingly, in the same manner as the second embodiment, the formation of regions where a polarity of voltage is inverted which is generated due to strain in the piezoelectric sensor (piezoelectric film) is suppressed. Accordingly, the lowering of detection sensitivity for detecting pressing force information can be prevented.

A shape of the panel is not limited to a rectangular shape or a square shape, and may be changed as desired. For example, even when the panel has a polygonal shape, a circular shape or the like, by disposing the deformation obstructing members in the inside of the casing and at positions close to the inner periphery of the adhesive material, the formation of regions where a polarity of voltage is inverted is suppressed. Accordingly, the lowering of detection sensitivity for detecting pressing force information can be prevented.

A material for forming the deformation obstructing member 70 is not limited to the material used in this embodiment, and can be changed as desired provided that the deformation obstructing members 70 can obstruct the deformation of the holding member 41 when a pressing operation is performed on the panel 25 (the first principal surface of the holding member 41). For example, wood, plastic, metal or the like may be used as the material for forming the deformation obstructing member 70.

The shape of deformation obstructing member 70 and the number of deformation obstructing members 70 are not limited to the shape and the number adopted by this embodiment, and can be changed as desired provided that the deformation obstructing member 70 can obstruct the deformation of the holding member 41 when a pressing operation is performed on the panel 25 (the first principal surface of the holding member 41). For example, a plurality of projections having a circular columnar shape, a polygonal columnar shape, a conical shape or a polygonal pyramid shape may be provided along the inner periphery of the adhesive material. Alternatively, one projecting member having a wedge shape, a semi-cylindrical shape or a rectangular parallelepiped shape may be disposed along the inner periphery of the adhesive material. The arrangement of the deformation obstructing members 70 is not limited to the arrangement adopted by this embodiment, and can be changed as desired provided that the deformation obstructing members 70 can obstruct the deformation of the holding member 41 when a pressing operation is performed on the panel 25 (the first principal surface of the holding member 41). That is, the deformation obstructing members 70 are not necessarily disposed parallel to the adhesive material.

A method of mounting the deformation obstructing members 70 on the casing 15 is not also limited to the mounting method adopted by this embodiment, and can be changed as desired. The deformation obstructing members 70 may be integrally formed with the casing 15, may be adhered to the casing 15 by an adhesive tape, or may be fixed to the casing 15 using bolts in combination with adhesion using an adhesive tape.

Other Embodiments

In the above-mentioned embodiments, the example where PLLA is used for forming the piezoelectric film is described. However, PDLA, poly-γ-methyl glutamate, poly-γ-benzyl glutamate, cellulose, collagen, or poly-D-propylene oxide may be used as a material for forming the piezoelectric film.

In the above-mentioned embodiments, the example where the piezoelectric sensor is formed using one piezoelectric film is described. However, the configuration of the piezoelectric sensor is not limited to such a configuration, and the piezoelectric sensor may be formed using a plurality of piezoelectric films. In the above-mentioned embodiments, the panel is formed by combining the piezoelectric sensor and the holding member with each other. However, the panel may be formed such that an electrostatic sensor or the like is interposed between the piezoelectric sensor and the holding member. With such a configuration, not only pressing force information but also a touch position can be detected.

DESCRIPTION OF REFERENCE SYMBOLS

5: circuit board
11, 12, 13, 14, 15: casing
20, 21, 22, 22S, 23, 24, 25: panel
30, 31, 32, 34, 35: piezoelectric sensor
40, 41, 42, 42S: holding member
51A, 51B, 52A, 52B, 52SA, 52SB, 52T, 53A, 53B, 54A, 54B, 55: adhesive material
60: region where a polarity of voltage is inverted
70: deformation obstructing member
100, 101, 102, 102S, 102T, 103, 104, 105: input terminal
301, 302: piezoelectric film
311, 312: piezoelectric voltage detecting electrode
321, 322: external connection terminal
332: adhesive sheet
900: uniaxial stretching direction

The invention claimed is:

1. An input terminal comprising:
a casing defining an opening;
a holding member having a first principal surface and a second principal surface opposing each other;
a piezoelectric film having a third principal surface and a fourth principal surface opposing each other and a periphery, the third principal surface facing the second principal surface of the holding member;
a first piezoelectric voltage detecting electrode on the third principal surface of the piezoelectric film;
a second piezoelectric voltage detecting electrode on the fourth principal surface of the piezoelectric film; and
an adhesive material having a first portion and a second portion, the adhesive material adhering an outer peripheral edge portion of the holding member to an end edge portion of the opening such that the periphery of the piezoelectric film is surrounded by the first portion and the second portion of the adhesive material, the first portion of the adhesive material having a first modulus of elasticity, the second portion of the adhesive material having a second modulus of elasticity different from the first modulus of elasticity, and the first portion and the second portion of the adhesive material do not overlap the piezoelectric film when viewed in a plan view of the input terminal.

2. The input terminal according to claim 1, wherein the first and second piezoelectric voltage detecting electrodes are configured to detect a voltage corresponding to an amount of strain in the piezoelectric film when a pressing operation is performed on the first principal surface of the holding member.

3. The input terminal according to claim 1, wherein the first modulus of elasticity of the first portion of the adhesive material is smaller than the second modulus of elasticity of the second portion of the adhesive material.

4. The input terminal according to claim 3, wherein
the holding member has a rectangular planar shape having two long sides and two short sides,
the first portion of the adhesive material extends along the two long sides of the holding member, and
the second portion of the adhesive material extends along the two short sides of the holding member.

5. The input terminal according to claim 1, wherein
the holding member has a rectangular planar shape having two long sides and two short sides,
the first portion of the adhesive material extends along the two long sides of the holding member, and
the second portion of the adhesive material extends along the two short sides of the holding member.

6. The input terminal according to claim 1, wherein the adhesive material adheres an entire outer peripheral edge portion of the holding member to the end edge portion of the opening portion.

7. The input terminal according to claim 1, wherein the piezoelectric film is a uniaxially stretched polylactic acid.

8. An input terminal comprising:
a casing defining an opening;
a holding member having a first principal surface and a second principal surface opposing each other;
a piezoelectric film having a third principal surface and a fourth principal surface opposing each other, the third principal surface facing the second principal surface of the holding member;
a first piezoelectric voltage detecting electrode on the third principal surface of the piezoelectric film;
a second piezoelectric voltage detecting electrode on the fourth principal surface of the piezoelectric film; and
an adhesive material having a first portion and a second portion, the adhesive material adhering an outer peripheral edge portion of the holding member to an end edge portion of the opening, wherein a first thickness of the first portion of the adhesive material and a second thickness of the second portion of the adhesive material differ from each other, or a first width of the first portion of the adhesive material and a second width of the second portion of the adhesive material differ from each other.

9. The input terminal according to claim 8, wherein the first thickness of the first portion of the adhesive material is larger than the second thickness of the second portion of the adhesive material.

10. The input terminal according to claim 9, wherein
the holding member has a rectangular planar shape having two long sides and two short sides,
the first portion of the adhesive material extends along the two long sides of the holding member, and
the second portion of the adhesive material extends along the two short sides of the holding member.

11. The input terminal according to claim 8, wherein the first width of the first portion of the adhesive material is smaller than the second width of the second portion of the adhesive material.

12. The input terminal according to claim 11, wherein
the holding member has a rectangular planar shape having two long sides and two short sides,
the first portion of the adhesive material extends along the two long sides of the holding member, and
the second portion of the adhesive material extends along the two short sides of the holding member.

13. The input terminal according to claim 8, wherein
the holding member has a rectangular planar shape having two long sides and two short sides,
the first portion of the adhesive material extends along the two long sides of the holding member, and
the second portion of the adhesive material extends along the two short sides of the holding member.

14. The input terminal according to claim 8, wherein the adhesive material adheres an entire outer peripheral edge portion of the holding member to the end edge portion of the opening portion.

15. The input terminal according to claim 8, wherein the first and second piezoelectric voltage detecting electrodes are configured to detect a voltage corresponding to an amount of strain in the piezoelectric film when a pressing operation is performed on the first principal surface of the holding member.

16. The input terminal according to claim 8, wherein the piezoelectric film is a uniaxially stretched polylactic acid.

17. An input terminal comprising:
a casing defining an opening;
a holding member having a first principal surface and a second principal surface opposing each other;
a piezoelectric film having a third principal surface and a fourth principal surface opposing each other, the third principal surface facing the second principal surface of the holding member;
a first piezoelectric voltage detecting electrode on the third principal surface of the piezoelectric film;
a second piezoelectric voltage detecting electrode on the fourth principal surface of the piezoelectric film; and
an adhesive material fixedly adhering an outer peripheral edge portion of the holding member to an end edge portion of the opening; and
a deformation obstructing member disposed in an inside of the casing and positioned along an inner periphery of the adhesive material, the deformation obstructing member obstructing a deformation of the holding member when a pressing operation thereof is performed, and wherein the deformation obstructing member is made of a material which limits a range of deflection of the holding member compared to that of the adhesive material.

18. The input terminal according to claim 17, wherein
the holding member has a quadrangular planar shape, and
the deformation obstructing member is disposed along at least one side of the holding member.

19. The input terminal according to claim 17, wherein
the holding member has a rectangular planar shape having two long sides and two short sides, and
the deformation obstructing member is disposed along the two short sides of the holding member.

20. The input terminal according to claim 17, wherein the piezoelectric film is a uniaxially stretched polylactic acid.

21. The input terminal according to claim 1, wherein the first portion and the second portion of the adhesive material completely surround the piezoelectric film.

* * * * *